United States Patent Office 3,515,790
Patented June 2, 1970

3,515,790
SUBSTITUTED BENZOQUINONES AND FUNGI-
CIDAL METHOD EMPLOYING SAME
Kurt E. Burdeska, Basel, Jost von der Crone, Riehen,
Raphael Menassé, Basel, and André Pugin, Riehen,
Switzerland, assignors, by mesne assignments, to H. A.
Whitten & Co., New York, N.Y., a partnership
No Drawing. Continuation of application Ser. No.
394,373, Aug. 10, 1964, which is a division of ap-
plication Ser. No. 338,006, Jan. 17, 1964. This ap-
plication July 9, 1968, Ser. No. 744,619
Claims priority, application Switzerland, Jan. 25, 1962,
926/62; Sept. 6, 1962, 10,610/62; Jan. 16, 1963,
504/63; July 23, 1963, 9,164/63
Int. Cl. A01n 9/20
U.S. Cl. 424—309                     14 Claims

ABSTRACT OF THE DISCLOSURE

A method is provided for combatting phytopathogenic fungi. The method comprises applying to an area of a substrate infested with fungi either (1) a halogenated acylamino-1,4-benzoquinone of the formula

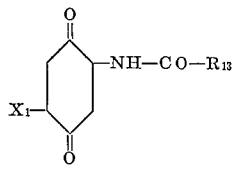

wherein $X_1$ is chlorine, bromine or fluorine and $R_{13}$—CO— is one of several specified acylamino groups, or (2) a halogenated acylamino-1,4-benzoquinone of the formula

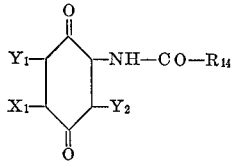

wherein
$X_1$ is chlorine, bromine, or fluorine,
each of $Y_1$ and $Y_2$ is bromine or chlorine and
$R_{14}$—CO— is one of several specified acylamino groups.

———

This application is a continuation of application Ser. No. 394,373, filed Aug. 10, 1964, now abandoned, which application is a division of application Ser. No. 338,006, filed Jan. 17, 1964, which application is in turn a continuation-in-part of application Ser. No. 252,591, now U.S. Pat. No. 3,232,932.

The present invention relates to a novel process for the production of dioxazines, as well as to novel products which comprise intermediates, fungicides, and pigments obtainable by said process.

Dioxazines, which have been used primarily as pigments, have been produced on an industrial scale from chloranil which is converted, for instance, to 2,5-dichloro-3,6-diamino-p-benzoquinone (J. A. Chem. Soc., 57, 1847 (1935)) and by acylation with an acylating agent such as acetic anhydride to the corresponding acylamino derivative; the latter is then further condensed and then cyclized with an aromatic amine, whereby the corresponding dioxazine is obtained. The known processes suffer from the drawbacks of relatively low overall yields, which are due to losses particularly in the initial stages of the process, and of relatively limited applicability with regard to the aforesaid acylation step; for instance, acylation with benzoic acid anhydride or chloride does not lead to industrially satisfactory results.

It is, therefore, an object of the present invention to provide a novel process for the production of dioxazines which affords higher yields and wider applicability than the known processes.

It is another object of the invention to provide novel intermediates in the production of dioxazines, particularly for the production of novel intermediates which are fungicides, and for the production of novel pigments, obtainable by said novel process.

These objects are attained by the process according to the invention, as illustrated in the flowsheet below, which process for the production of dioxazines comprises the following steps:

(a) Mixing and heating at from about 30° to 250° C. a readily available starting compound of the formulae

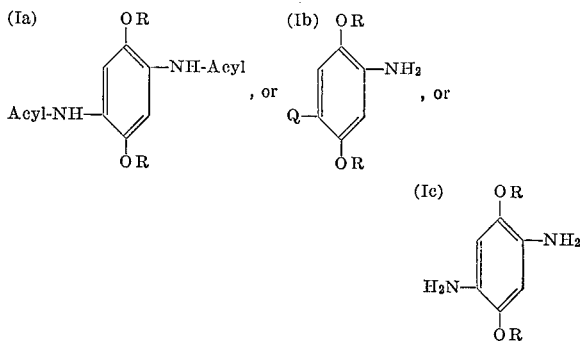

wherein
R is a lower alkyl, a benzyl or a phenyl radical,
Q is chlorine, bromine, or fluorine, a phenoxy or a lower alkoxy radical, and
Acyl is an unsubstituted alkanoic acyl radical, a chloroalkanoic acyl radical, a bromo-alkanoic acyl radical, an alkoxy-alkanoic acyl radical, a cyclo-alkanoic acyl radical, an aralkanoic acyl radical, a benzoic acyl radical, a naphthoic acyl radical, or an alkoxy carbonyl radical, with an acylating agent which is either a compound of the formula

or a compound of the formula acyl-Y wherein
Acyl has the above-given meaning, and
Y is chlorine or bromine,
and separating the resulting compound of the formula

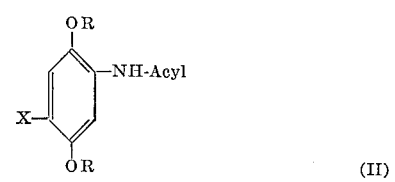

wherein
X is a phenoxy, or lower alkoxy radical, —NH-Acyl, chlorine, bromine and fluorine, depending on the nature of the starting material, and
R and Acyl have the aforesaid meanings,
from the reaction mixture.

Step (a) is suitably carried out in an inert organic solvent, preferably an unsubstituted or halogenated aromatic hydrocarbon.

When step (a) is carried out with a mixture of a compound of the formula Acyl-Y, an acid binding agent is used which is preferably an alkali metal acetate or an alkaline earth metal oxide, carbonate and hydroxide.

More particularly, the intermediate compounds of Formula II can contain the following groups: as alkoxy substituents, methoxy, ethoxy, propoxy or butoxy groups; as aralkoxy substituents, benzyloxy groups; as phenoxy substituents, phenoxy groups which may be substituted in the nucleus such as phenoxy, methyl or halogenophenoxy groups.

Advantageously an acylamino - 1,4 - dialkoxybenzene having lower alkoxy groups is used as intermediate II, particularly a dimethoxy- or diethoxy-acylaminobenzene compound.

Preferred intermediates II are 2,5-diacylamino-1,4-dialkoxybenzenes and 2-acylamino-5-halogen-1,4-dialkoxybenzenes. "Halogen" therein means, for example, bromine, fluorine or particularly chlorine. The acyl radical of the acylamino groups is derived, for example, from aliphatic carboxylic acids, more particularly unsubstituted alkanoic acids, preferably of not more than 18 carbon atoms, such as formic acid, acetic acid, propionic acid, butyric acid, valeric acid, caproic acid, caprylic acid, caprinic acid, lauric acid, palmic acid or stearic acid, chloro- or bromo-substituted alkanoic acids of preferably not more than 4 carbon atoms, e.g., chloro- or bromoacetic acid, α- or β-chloropropionic acid or α- or β-bromopropionic acid, alkoxy-substituted alkanoic acids in which alkoxy is preferably of 1 to 4 carbon atoms and the total number of carbon atoms of which does preferably not exceed 10 carbon atoms, methoxy- or ethoxyacetic acid, from aminoalkanoic acids which may be N-, preferably lower alkyl or N-aryl-substituted, and the total number of carbon atoms of which does preferably not exceed 10 carbon atoms, aminoacetic acid, α- or β-aminopropionic acid, or N-phenyl-amino acetic acid, from an alkenoic acid of preferably not more than 5 carbon atoms, acrylic or methacrylic acid or from cycloalkanoic acids such as cyclohexane carboxylic acid, from aralkanoic acid, from aralkanoic and aralkenoic acids of preferably not more than 10 carbon atoms each, such as phenylacetic acid, α- or β-phenylpropionic acid, α-phenylacrylic acid or cinnamic acid, from aromatic carbocyclic carboxylic acids with preferably not more than 12 carbon atoms, such as benzoic acid, methyl-, chloro-, methoxy- or nitrobenzoic acids, α- or β-naphthoic acid, from aromatic heterocyclic carboxylic acids having preferably not more than 8 carbon atoms and nitrogen as hetero atom such as pyridine carboxylic acids: as an alkoxycarbonyl radical with preferably not more than 8, and most advantageously from 4 to 6 carbon atoms, derived from monoesters of carbonic acid with alkanols or with polyalkylene glycol monoalkyl ethers, as a carbamyl radical with preferably not more than 9 carbon atoms, derived from carbamic or thiocarbamic acids such as methyl-, ethyl- or phenyl- or carbamic acid, or, as an alkyl sulfonyl or aryl sulfonyl radical with preferably not more than 10 carbon atoms, derived from organic sulfonic acids such as methane-, ethane, benzene- or p-toluene-sulfonic acid or from cyclic carboxylic acids such as cyanuric acid or derivatives thereof, preferably 2,4-di- or 2,4,6-trichloro-s-triazine, 2,4,5,6-tetrachloro pyrimidine, or 2,3-dichloroquinoxaline.

The aforesaid intermediates II are obtained, for example, by acylating the corresponding amino-1,4-dialkyloxybenzene compounds with suitable acylating agents such as, e.g. with the halides or anhydride of organic carboxylic acids, the halides of carbonic acid monoesters as well as the halides of organic sulfonic acids or with the halides of cyclic carbonic acid imides or with inner anhydrides such as ketones or isocyanates.

(b) Mixing the recovered compound of Formula II in a liquid medium inert to oxidation with nitric acid having a strength of at least 0.5-normal, at a temperature of about 10° to 100° C., thereby oxidizing the last-mentioned compound to the corresponding one of the formula

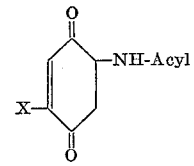

wherein Acyl and X have the aforesaid meanings, and seperating the latter compound from the reaction mixture.

It is very surprising that this treatment, which can be effected successfully even with nitric acid of high concentration such as fuming nitric acid, affords an excellent oxidation with high yields of products of Formula III in which even highly susceptible radicals —NH-acyl are left intact. It becomes thus possible to subject compounds of Formula II with a large variety of substituents to this treatment of step (b), among which there are the benzoyl and other interesting radicals, leading to intermediates of Formula III which are themselves, or can, in turn, be converted by the next following step (c) to compounds which are surprisingly useful as fungicides.

It is especially surprising that, with the preferred oxidizing agent, nitric acid, the oxidation proceeds so easily with replacement of the ether groups by carbonyl oxygen without saponification of the acylamino groups and also that no other great changes are caused. The easy formation of 2,5-bis-acylamino-1,4-benzoquinones from 2,5-bis-acylamino-1,4-dialkoxy, -aralkoxy- and -phenoxybenzenes is also surprising in view of the papers by Roger Adams and coworkers (see, e.g., J. Am. Ch. Soc. 72 (1950) pp. 4601, 5154), who have shown by many examples that in the oxidation of p-bis-acylamido-benzenes and p-bis-sulfamido-benzenes, the corresponding p-quinone acylimides or p-quinone sulfimides are formed which are capable of various addition reactions.

In some cases it is also possible to perform the oxidation and halogenation in one step by oxidizing in the presence of halogen hydracids such as hydrochloric or hydrobromic acids.

Both the above-described oxidation to form quinones and the subsequent halogenation thereof are advantageously performed in the presence of an inert organic solvent, and this independently of whether these two operations are performed in one or two steps. Suitable solvents are, for example, glacial acetic acid or aliphatic or aromatic hydrocarbons which may be halogenated such as chloroform, carbon tetrachloride, tetrachloroethane, chlorobenzenes or nitrobenzene.

Acylamino-1,4-benzoquinone compounds of the most various types are obtained by this step of the process according to the invention. Thus it is also possible to produce 2,5-diacylamino-1,4-benzoquinones the acyl radicals of which are unsymmetrically substituted.

The strength of the nitric acid used as oxidizing agent in this step (b) ranges preferably from 8-normal $HNO_3$ to fuming nitric acid, with 10-normal $HNO_3$ being most preferred. 3 to 4 moles of nitric acid are preferably used per mole of compound of Formula II.

Very satisfactory results are obtained, with almost theoretical yield rates, when using the last-mentioned nitric acid, glacial acetic acid as the solvent in step (b) and maintaining a temperature of about 20 to 50° C. during this treatment.

(c) Mixing the aforesaid compound of Formula III in a solvent inert to halogenation, with a halogenating agent, which is preferably elementary bromine or chlorine, at about 0° to 200° C., thereby halogenating the compound of Formula III to a compound of the formula

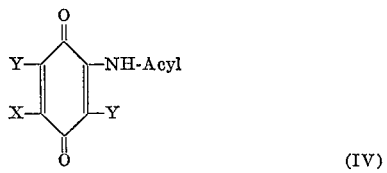

wherein Acyl and X have the aforesaid meanings and Y represents chlorine or bromine, and, preferably, separating the latter compound from the reaction mixture.

Preferably, this step (c) is carried out with bromine as halogenating agent in an inert solvent such as chloroform, dichlorobenzene or glacial acetic acid.

(d) Mixing the aforesaid compound of Formula IV in an inert organic solvent having a boiling point of at least 70° C., and preferably above 140° C., such as a tri-lower alkyl amine—and preferably in tri-isopropyl amine to obtain optimal results—with at least two moles of an aromatic amine, at least part of the aromatic nucleus of which consists of a benzene ring substituted (1) with one —NH₂ group and (2) in one ortho-position thereto with a substituent which is either lower alkoxy, cycloalkoxy, mononuclear carbocyclic aralkoxy, carbocyclic aryloxy or carbocyclic arylthio; and an acid binding agent, such as an alkali metal acetate or magnesium oxide or hydroxide, and heating at least during the final phase of the ensuing reaction at a temperature of about 140° to 300° C., and maintaining, at least throughout said final phase of said ensuing reaction, a weakly acid medium, thereby obtaining a dioxazine of the formula

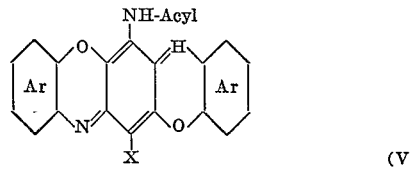

wherein

Acyl and X have the aforesaid meanings, and

Ar represents the radical of said aromatic amine the benzene ring of which is condensed with the quinone ring of said compound of Formula IV under removal of the aforesaid substituent Z;

and recovering the dioxazine of Formula V from the reaction mixture.

The aromatic nucleaus of the aromatic amine used in step (d) is in particular one of the nuclei

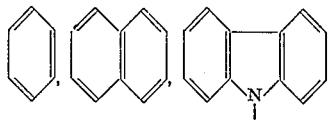

substituted in the manner defined above.

Step (d) is preferably carried out at a temperature of about 150° to 260° C. in a halogenated aromatic solvent such as dichlorobenzene, tri-chlorobenzene, nitrobenzene and chloronaphthalene, and the reaction medium of step (d) is maintained weakly acid by addition thereto of a buffering agent, preferably sodium acetate.

The condensation of the compound of Formula IV in step (d) with the aromatic amine, and the cyclization of the resulting condensate to the corresponding dioxazine can be carried out in two phases, or, preferably, in a single step.

In the latter case, the compound of the Formula IV is mixed directly with at least 2 moles of the aforesaid aromatic amine, at least part of the aromatic nucleus of which consists of a benzene ring substituted with one —NH₂ group and wherein at least one of the two ortho-positions to said —NH₂ is occupied by hydrogen while the other ortho-position is free from a substituent condensable with a quinonic oxygen atom of the compound of Formula IV; an acid binding agent and a mild oxidizing agent, and heating at a temperature of about 140° C. to 300° C. and maintaining throughout the ensuing reaction a weakly acid medium.

The process for the production of dioxazines, according to the invention, offers several important advantages, among which is particularly easy accessibility of the starting materials of Formulas Ia, Ib and Ic, which are either commercially available materials, or can be easily produced from the latter at low cost and with excellent yields; a great variety of hitherto unsuitable substituents can now be introduced into the intermediates of Formulas III and IV, and consequently into the final dioxazines; the overall yield of the process according to the invention is very good, being above 95%, calculated on the amount of starting material of Formula I, for the product of step (b), about 85% and higher for the product of step (c) and still above 50% and as high as 70% and even better for the final dioxazine.

In contrast thereto, we have found that the comparable stage of the prior art processes leading to products falling under the Formula IV affords yield rates in the order of 45%, calculated on the amount of chloranil used as starting material.

A further important advantage of the process according to the invention resides in the much shorter time required for carrying it out in practice. Thus, where the prior art processes require, for instance, 6 hours to obtain dioxazine from chloranil, the instant process requires only about 1 hour.

Another aspect of the present invention concerns novel acylamino-1,4-benzoquinone intermediates in the production of dioxazines in the above-described process.

Known acylamino-1,4-benzoquinones which have been used as intermediates in the production of dioxazine dyestuffs, are 2,5-diacetylamino- and 2,5-dibenzoylamino-1,4-benzoquinone and also 2,5-diacetylamino- or 2,5-dipropionyl-amino-3,6-dichloro-1,4-benzoquinone. The first quinone mentioned is obtained by oxidizing 2,5-diacetyl-aminophenol with sodium bichromate, and 2,5-dibenzoylaminobenzoquinone, 2,5-diacetylamino- or 2,5-dipropionylamino - 3,6-dichloro-1,4-benzoquinone are obtained by reacting 2,5 - diamino - 1,4 - benzoquinone or 2,5 - diamino-3,6-dichloro-1,4-benzoquinone with benzoyl chloride or acetic acid anhydride or propionic acid anhydride respectively. Thus, they have been produced from starting materials which in themselves are not easily accessible, and with only moderate yields of acylamino compounds.

The novel acylamino-1,4-benzoquinones are distinguished from the last-described known compounds by their structure which is comprised by Formula III or Formula IV. Of particular interest as important intermediates are the compounds of the formula

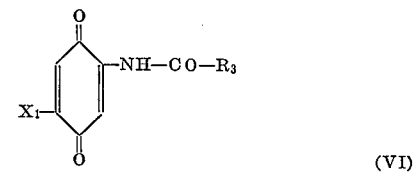

wherein $X_1$ is a member selected from the group consisting of chlorine, bromine and fluorine, and $R_3$ is a member selected from the group consisting of a chloro-substituted and a bromo-substituted alkanoic acyl radical each with maximally 4 carbon atoms, an alkoxy-substituted alkanoic acyl radical with a total of maximally 10 carbon atoms, and wherein alkoxy has maximally 4 carbon atoms; an N-unsubstituted, an N-lower alkyl-substituted and an N-phenyl-substituted amino alkanoic acyl radical, each of which has a total of maximally 10 carbon atoms, an alkenoic acyl radical with maximally 5 carbon atoms, a cyclohexane carboxylic acyl radical, an aralkanoic radical with maximally 10 carbon atoms, an aromatic carbocyclic hydrocrbon carboxylic acyl radical with maximally 12 carbon atoms, which compounds are obtained by step (b) from the corresponding starting material of Formula I*b*.

Oxidation and halogenation of compounds of Formula I*b* according to steps (b) and (c) of the above-described process produces, among others, compounds of formula

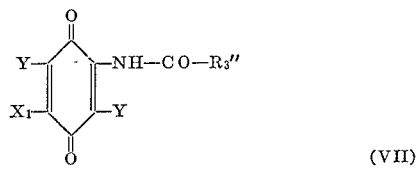

(VII)

wherein $X_1$ is a member selected from the group consisting of chlorine, bromine and fluorine, Y is a member selected from the group consisting of chlorine, and bromine, and $R_3''$ is a member selected from the group consisting of a chloro-substituted and a bromo-substituted alkanoic acyl radical each with maximally 4 carbon atoms, an alkoxy-substituted alkanoic acyl radical with a total of maximally 10 carbon atoms, and wherein alkoxy has maximally 4 carbon atoms; an N-unsubstituted, an N-lower alkyl-substituted and an N-phenyl-substituted amino alkanoic acyl radical, each of which has a total of maximally 10 carbon atoms.

From among the compounds falling under Formulas VI and VII and structurally closely related compounds obtainable in the same manner, the production of which conforms to the methods by which the compounds of the last-mentioned formulas are produced, those of the formulas

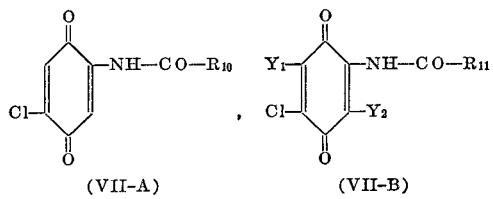

(VII-A)    (VII-B)

and

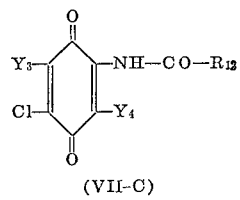

(VII-C)

wherein
each of $Y_1$ and $Y_2$ represents a member selected from the group consisting of bromine and chlorine,
each of $Y_3$ and $Y_4$ represents a member selected from the group consisting of
hydrogen, chlorine and bromine, and
$R_{10}CO—$, in Formula VII-A, represents a member selected from the group consisting of unsubstituted alkanoic acyl of from 3 to 10 carbon atoms,
mono to tri-chloro-, mono- to tri-bromo- and mono- to tri-fluorosubstituted alkanoic acyl of from 2 to 19 carbon atoms,
phenyl-carbonyl,
chloro-phenyl carbonyl.

It is particularly surprising that the compounds of Formulas VII-A/C which are characterized by a chlorine atom in 2-position at the benzoquinone nucleus are distinguished from the corresponding similarly substituted 2-bromo-benzoquinones by much stronger fungicidal activity against a much greater number of the aforesaid species. Thus, the known 2,3,6-tri-bromo-5-acetyl-amino-1,4-benzoquinone shows only significant activity against two of the above-enumerated strains, namely against *Botrytis cinerea* and against *Clasterosporium c.*, while 2-chloro - 3,6 - dibromo-5-acetylamino-1,4-benzoquinone is ten times more active against these two fungi and is moreover also very active against the six remaining species against which the aforesaid known compound fails to show fungicidal activity of practical significance.

Other 2 - bromo derivatives such as 5 - chloroacetyl-amino-2-bromo- and 5-chloroacetylamino-2,3,6-tribromo-1,4-benzoquinone show no practically significant activity against any of the aforesaid eight species, while the corresponding 2-chloro analogs show good to very good activity against 5 to 8 of these species.

The present invention therefore concerns, in another aspect, fungicidal 2-chlorinated 5-acylamino-1,4-benzoquinones as well as compositions containing the same as active ingredients, and also the use of halogenated acyl-amino-1,4-benzoquinones and of compositions containing the same in a method for controlling phytopathogenic fungi.

In a further aspect the present invention concerns new fungicidal agents which contain 2-halogenated 5-acylamino-1,4-benzoquinones falling under Formulas VI and VII as active ingredients, processes for the production of these agents as well as the method of combatting phytopathogenic fungi of the Botrytis and Clasterosporium type using such active ingredients or agents which contain these active ingredients.

Details concerning these aspects of the invention are given further below.

Oxidation in accordance with step (b) of the process according to the invention produces, among others, particularly interesting compounds of the formula

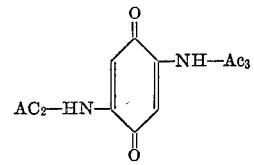

wherein each of $Ac_2$ and $Ac_3$ is, independently, a member selected from the group consisting of a chloro-alkanoic acyl radical with maximally 4 carbon atoms, a bromalkanoic acyl radical with maximally 4 carbon atoms, an alkoxy-alkanoic acyl radical with maximally 10 carbon atoms, a cycloalkanoic acyl radical with 6–7 carbon atoms, an aralkanoic acyl radical with maximally 10 carbon atoms, a naphthoic acyl radical with maximally 12 carbon atoms, a pyridinocarboxylic acyl, and a lower alkoxy carbonyl radical preferably from the corresponding starting compounds of Formula I*a*, when $Ac_2$ and $Ac_3$ in Formula VIII are to represent different radicals, and from starting compounds of Formula I*c* when compounds of Formula VIII are desired in which $Ac_2$ and $Ac_3$ are identical.

Halogenation of the intermediates of Formula VIII in accordance with step (c) of the above-described process leads to the formation of halogenated products, of which these of the formula

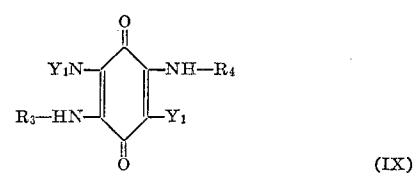

(IX)

wherein
$Y_1$ is a member selected from the group consisting of chlorine and bromine, and
each of $R_3$ and $R_4$ is, independently, a member selected from the group consisting of a mononuclear carbocyclic aralkanoic acyl radical of maximally 10 carbon atoms and an aromatic carbocyclic hydrocarbon carboxylic acyl radical with maximally 12 carbon atoms, are of special interest as intermediates for dioxazines which are excellent pigments.

Particularly interesting as intermediates are those of the above Formula IX in which $Y_1$ is bromine.

Further details concerning the above aspect of the invention can be seen from the following non-limitative examples. Where not otherwise stated, parts are given as parts by weight. The temperatures are in degrees centigrade. The relationship of parts by weight to parts by volume is as that of grams to cubic centimeters. The melting points were determined in a metal block and are not corrected.

EXAMPLE 1

2,5-di-(4'-chlorobenzoylamino)-1,4-benzoquinone 47.33 parts of 2,5-di-(4'-chlorobenzoylamino)-1,4-diethoxybenzene are suspended in 300 parts of glacial acetic acid. A mixture of 40 parts of 63% nitric acid and 40 parts of glacial acetic acid is poured into this suspension while stirring well. The mixture is stirred for 15 minutes at 40–50° and then cooled to 10°. The yellow 2,5-di-(4'-chlorobenzoylamino)-1,4-benzoquinone which precipitates in a very pure form is filtered off. To further purify, it is recrystallised from 1,2-dichlorobenzene or from glacial acetic acid.

M.P.: >320° (under decomposition); the yield is 96% of the theoretical.

The 2,5-di-(4'-chlorobenzoylamino)-1,4-diethoxybenzene used as starting material is produced by reaction of 1 mol of 2,5-diamino-1,4-diethoxybenzene with 2 mols of 4-chlorobenzoyl chloride.

Other 2,5-diacylamino-1,4-benzoquinones characterised by their melting points are produced in the yields given if, instead of 2,5-di-(4'-chlorobenzoylamino)-1,4-diethoxy-benzene, compounds of the formula

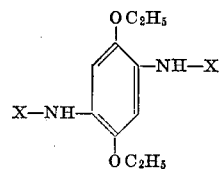

are used wherein X has the meaning given in column II of Table I, and otherwise the procedure described in the example is followed.

TABLE I

| Example No. | X | M.P. of corresponding quinone | Yield in percent of theoretical |
|---|---|---|---|
| 2 | —COCH₃ | 300 D | 84 |
| 3 | —COC₅H₁₁ | 240° | 87 |
| 4 | —COOCH₃ | 250–260 D | 94 |
| 5 | —COOC₂H₅ | 210–211 | 94 |
| 6 | —COOCH₂CH₂—OCH₃ | 142–143 | 98 |
| 7 | —CO—C₆H₅ | 258–260 | 90 |
| 8 | —CO—C₆H₄—CH₃ | >320 D | 85 |
| 9 | —CO—C₆H₄—OCH₃ | 305–307 D | 88 |
| 10 | —CO—C₆H₄(Cl) | 237–238 | 93 |
| 11 | —CO—C₆H₃(Cl)—Cl | 273–275 | 85 |
| 12 | —CO—CH₂—C₆H₅ | 223–224 | 87 |
| 13 | —COCH=CH—C₆H₅ | >330 D | 84 |
| 14 | —CO—(pyridyl) (quinones isolated as HNO₃ salt) | >320 D | 84 |
| 15 | —SO₂—C₆H₅ | >260 D | 88 |
| 16 | —SO₂—C₆H₄—NO₂ | 272–273 D | 92 |
| 17 | —SO₂—CH₃ | >320 D | 87 |
| 18 | —CO—CH₂—CH₂—Cl | | |
| 19 | —COO—CH₂—CH₂—Cl | | |

Note.—D means under decomposition.

EXAMPLE 20

2-(2',4'-dichlorobenzoylamino)-5-benzoylamino-1,4-benzoquinone 14.2 parts of 2-(2',4'-dichlorobenzoylamino)-5-benzoylamino-1,4-diethoxybenzene are suspended in 250 parts of glacial acetic acid. A mixture of 15 parts by volume of fuming nitric acid (density=1.52) and 15 parts by volume of glacial acetic acid is added while stirring to this suspension at 40°. After stirring for 20 minutes and cooling to 10°, the yellow 2-(2',4'-dichlorobenzoylamino) - 5-benzoylamino - 1,4-benzoquinone formed is filtered off and washed, first with water and then with ethanol. Crystallised from glacial acetic acid, it forms long golden yellow needles. M.P. 205–207°. Yield: 87%.

The 2-(2',4'-dichlorobenzoylamino) - 5-benzoylamino-1,4-diethoxybenzene used as starting material is obtained by condensation of 1 mol of 2-amino-5-benzoylamino-1,4-diethoxybenzene with 1 mol of 2,4-dichlorobenzoyl chloride.

If, instead of 2-(2',4'-dichlorobenzoylamino)-5-benzoylamino - 1,4-diethoxybenzene, compounds of the formula

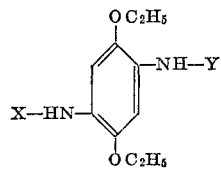

are used in which X and Y have the meanings given in columns II and III of Table II and otherwise the procedure described in the example is followed, then other 2,5-diacylamino-1,4-benzoquinones unsymmetrically substituted at the acyl groups are obtained in the yields given. The melting points are given in column IV of the table:

EXAMPLE 26

2-chloro-5-(4'-chlorobenzoylamino)-1,4-benzoquinone 16.8 parts of 2-chloro-5-(4'-chlorobenzoylamino)-1,4-dimethoxybenzene are finely pulverised and suspended in 100 parts by volume of glacial acetic acid. At 25°, a mixture of 20 parts of 63% nitric acid and 20 parts by volume of glacial aceic acid is poured in. The temperature rises about 10°. For a short time a strongly yellow coloured solution is formed from which the yellow quinone precipitates. The reaction mixture is stirred for another 10 minutes, then cooled to 10° and the precipitate is filtered off under suction. Still further quinone is obtained by precipitation from the filtrate with water. The quinone is first washed with water and then it is washed with a little ethanol. It is further purified by recrystallisation from glacial acetic acid and it then melts at 168°; the yield is quantitative.

Other 2-chloro-5-acylamino - 1,4-benzoquinones characterised by their melting points are given in the following table. They are obtained in the yields given if, instead of 2-chloro - 5-(4'-chlorobenzoylamino)-1,4-dimethoxybenzene, compounds of the formula

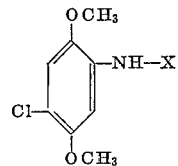

are used wherein X has the meaning given in column II of Table III and otherwise the procedure described in the example is followed.

Those of these compounds of Table III as well as those of the compounds described in the following Examples 55 to 77k (Table IV below) which fall under Formulas VII–A/C are distinguished by good to very good fungicidal activity as outlined hereinbefore, accompanied by generally extraordinarily slight phytotoxicity.

TABLE II

| Example No.: | X | Y | M.P. of the corresponding quinones | Yield in percent of theoretical |
|---|---|---|---|---|
| 21 | —COCH₃ | —CO—⌬ | 236–237 D | 83 |
| 22 | —COCH₃ | —CO—NHC₂H₅ | 244–245 D | 88 |
| 23 | —COCH₃ | —SO₂CH₃ | 246–247 D | 89 |
| 24 | —COCH₃ | —COOC₂H₅ | 254–255 D | 86 |
| 25 | —COOCH₃ | —CO—⌬ | 185–186 | 87 |

NOTE.—D means under decomposition.

TABLE III

| Example No.: | X | M.P. of the corresponding quinones | Yield in percent of theoretical |
|---|---|---|---|
| 27 | —COCH₃ | 174–175 | 93 |
| 28 | —COOCH₃ | 172 | 88 |
| 29 | —COOC₂H₅ | 98 | 86 |
| 30 | —SO₂CH₃ | 197–198 D | 94 |
| 31 | —SO₂—⌬ | 181–182 | 97 |
| 32 | —CO—⌬ | 152–154 | 92 |
| 33 | —CO—⌬—OCH₃ | 187–188 | (¹) |
| 34 | —CO—⌬—CH₃ | 165–166 | (¹) |
| 35 | —CO—⌬—NO₂ | 192–193 | 96 |

See footnote at end of table.

TABLE III—Continued

| X | M.P. of the corresponding quinones | Yield in percent of theoretical |
|---|---|---|
| Example No.: | | |
| 36 ............... CO—CH₂—⟨phenyl⟩ | 194–195 D | 97 |
| 37 ............... —CO—CH=CH—⟨phenyl⟩ | 240–241 D | 90 |
| 38 ............... —CONH—⟨phenyl⟩ | 224 D | 97 |
| 39 ............... —CO(CH₂)₆—CH₃ | 118–120 | 95 |
| 40 ............... —CO(CH₂)₇—CH₃ | 114–115 | 89 |
| 41 ............... —CO(CH₂)₈—CH₃ | 115–116 | 78 |
| 42 ............... —CO(CH₂)₁₀—CH₃ | 115–117 | 85 |
| 43 ............... —CO(CH₂)₁₄—CH₃ | 117–119 | 87 |
| 44 ............... —CO(CH₂)₁₆—CH₃ | 111–113 | 83 |
| 45 ............... —COOCH₂CH₂Cl | 174–175 | 92 |
| 46 ............... —COC₅H₁₁ | 137–138 | 92 |
| 47 ............... —COOCH₂CH₂OCH₃ | 117 | 89 |
| 48 ............... COO—⟨phenyl⟩ | 157 | 95 |
| 49 ............... —CO—CH₂Cl | 157–158 | 92 |
| 50 ............... COOC₃H₇ | --- | --- |
| 51 ............... COOC₄H₉ | --- | --- |
| 52 ............... COCHCl₂ | 157 | 87 |
| 53 ............... COCCl₃ | 197–198 | 89 |
| 54 ............... CO—⟨H⟩ | 166–167 | 96.5 |
| 54a ............... CO—OCH₂CH₂CH₂Cl | 134 | --- |
| 54b ............... CO—OCH(CH₂Br)₂ | 122 | --- |
| 54c ............... CO—OC₁₀H₂₁ | 71 | --- |
| 54d ............... CO—OC₁₂H₂₅ | 75 | --- |
| 54e ............... CO—CH₂O(CH₂)₅CH₃ | 66 | --- |
| 54f ............... CO—CH₂CH₂Cl | 178–179 | --- |
| 54g ............... CO—CH=CHCH₃ | 155 | --- |
| 54h ............... CO—CHBrCHBrCH₃ | 124–126 | --- |
| 54i ............... CO—(CH₂)₄CH₃ | 158–159 | --- |
| 54j ............... CO—⟨phenyl⟩—Cl | 168 | --- |
| 54k ............... CO—⟨phenyl with CF₃⟩ | --- | --- |
| 54l ............... 2-fluoro-5-(β-chloropropionyl)amino 1,4-benzoquinone. | | |

¹ Quantitative.
NOTE.—D means under decomposition.

The starting material for the latter compound, 2,5-dimethoxy-4-β-chloro-propionylamino - 1 - fluorobenzene, is produced from 2,5-dimethoxy-4-nitraniline by diazotation with addition of borofluoric acid or sodium borofluoride and thermic decomposition of the resulting 2,5-dimethoxy-4-nitro-1-diazoniumbenzene tetrafluoroborate, in accordance with the method described by Schiemann in J. für prakt. Chemie, 140 p. 7 et seq. (1934), conversion of the resulting 2,5-dimethoxy-4-nitro-1-fluorobenzene by catalytic hydrogenation to 2,5-dimethoxy-4-amino-2-fluorbenzene and acylation of the latter in a known manner to the aforesaid starting material.

EXAMPLE 55

59.22 parts of the 2-chloro-5-(4'-chlorobenzoylamino)-1,4-benzoquinone obtained in Example 26 are suspended in 300 parts by volume of chloroform. At 20–30°, a mixture of 24.8 parts by volume of bromine and 50 parts by volume of chloroform is added to this suspension within 30 minutes. The reaction mixture is then stirred for 15 hours at room temperature, 300 parts by volume of ethanol are added, whereupon the temperature rises by 10 degrees and then the whole is stirred for another hour. The reaction mixture is then cooled to 0 to 5° and the precipitated quinone is filtered off. It is washed first with water and then with ethanol and dried.

The 2-chloro-5-(4'-chlorobenzoylamino)-3,6-dibromo-1,4-benzoquinone crystallizes from ethanol in yellow crystals. M.P. 211; yield 92% of the theoretical.

EXAMPLE 56

37.2 parts of 2-chloro-5-[3'-diethylamino-5'-chloro-triazinylamino-(1')]-1,4-dimethoxybenzene (M.P. 161–162°), produced by condensation of cyanuric chloride with one mol of 2,5-dimethoxy-4-chloroaniline and one mol of diethylamine, are suspended in 200 parts of glacial acetic acid are poured in at room temperature. For a moment a solution is formed from which the quinone precipitates in crystalline form. The suspension is stirred for 10 minutes at 20–25°, then cooled to 10° and filtered. The resulting 2-chloro-5-[3'-diethylamino - 5' - chloro-triazinylamino-(1')]-1,4-benzoquinone is washed first with water and then with cold alcohol and dried. Yield: 97.4% of the theoretical.

EXAMPLE 57

When, instead of 37.2 parts of 2-chloro-5-[3'-diethyl-amino-5'-chloro-triazinylamino-(1')] - 1,4 - dimethoxy-benzene, 40.6 parts of the condensation product from one mol 2,4,5,6-tetrachloro-pyrimidine and one mol of 2,5-dimethoxy-4-chloro-aniline and one mol of diethylamine is used and otherwise the procedure described in Example 55 is followed, then the corresponding quinone product which is a mixture of a major portion of the compound of the formula

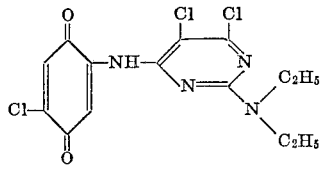

and a minor portion of the compound of the formula

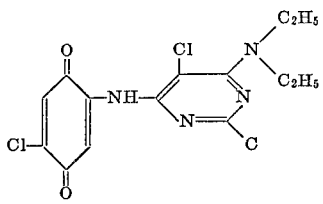

is obtained in similarly good yields.

EXAMPLE 58

39.7 parts of the condensation product of 1 mol of 2,6-dichloro-pyrimidine-4-carboxylic acid chloride and 1 mol of 1-amino-4-chloro-2,5-dimethoxybenzene in 250 parts of glacial acetic acid are treated at 20 to 30° with 30 parts of 10 N nitric acid. A yellow quinone of the formula

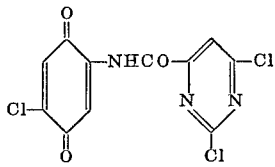

precipitates and it is isolated in the usual way.

EXAMPLE 59

A yellow quinone of the formula

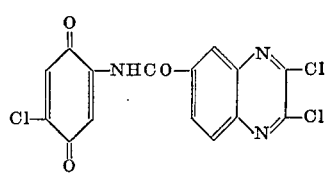

is obtained when instead of the condensation product of 2,6-dichloro-pyrimidine-4-carboxylic acid chloride and 1-amino-4-chloro-2,5-dimethoxybenzene, 40.25 parts of the condensation product of 1 mol of 2,3-dichloro-quinoxaline-6-carboxylic acid chloride and 1 mol of 1-amino-4-chloro-2,5-dimethoxybenzene are used and the procedure given in Example 58 is followed.

When, instead of 2-chloro-5-(4'-chlorobenzoylamino)-1,4-benzoquinone used in Example 55, compounds are used of the formula

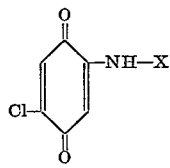

wherein X has the meaning given in column II of the following table and otherwise the procedure described in Example 55 is employed, then further 2-chloro-5-acylamino-3,6-dibromo-1,4-benzoquinones are obtained the melting points of which can be seen from column III of Table IV:

TABLE IV

| Example No. | X | M.P., °C. |
|---|---|---|
| 60 | $CO(CH_2)_6CH_3$ | 138–140 |
| 61 | $CO(CH_2)_7CH_3$ | 136–137 |
| 62 | $CO(CH_2)_8CH_3$ | 134–136 |
| 63 | $CO(CH_2)_{10}CH_3$ | 131–132 |
| 64 | $CO(CH_2)_{14}CH_3$ | 131–133 |
| 65 | $CO(CH_2)_{16}CH_3$ | 134–137 |
| 66 | $COCH_2Cl$ | 192–193 |
| 67 | $COCH_2CH_2Cl$ | 178–179 |
| 68 | $COOCH_2CH_2Cl$ | 155–156 |
| 69 | —COCH$_2$—⟨C$_6$H$_5$⟩ | 186 |
| 69a | —CO—O—CH$_2$—CH=CH—⟨C$_6$H$_5$⟩ | |
| 70 | —$COOCH_2CH_2OCH_3$ | 126 |
| 71 | $COC_5H_{11}$ | 158–159 |
| 72 | COO—⟨C$_6$H$_5$⟩ | 176–177 |
| 73 | $COCH_3$ | 182 |
| 74 | $COCHCl_2$ | 208–209 |
| 75 | CO—⟨C$_6$H$_5$H⟩ | 175–176 |
| 76 | $COCCl_3$ | 204–205 |
| 77 | $SO_2CH_3$ | 201 |
| 77a | $CO—OCH_3$ | 169 |
| 77b | $CO—OC_2H_5$ | 115–116 |
| 77c | $CO—O-n-C_3H_7$ | 122 |
| 77d | $CO—OC_3H_6Cl$ | 143 |
| 77e | $CO—OC_{10}H_{21}$ | 66 |
| 77f | $CO—OC_{12}H_{25}$ | 69 |
| 77g | $CO—OCH(CH_2Br)_2$ | |
| 77h | $CO—CH_2O(CH_2)_5CH_3$ | 77 |
| 77i | $CO—CHBrCHBrCH_3$ | 183 |
| 77j | 2-fluoro-3,6-dibromo-5-β-chloropropionylamino-1,4-benzoquinone (from the compound of Example 54 1. | |

EXAMPLE 77k

Example 55 is repeated, but instead of 24.8 parts by volume of bromine, gaseous chlorine is introduced into the solution in sufficient amount and for a sufficient length of time, so that at least 2 moles of chlorine are retained in the reaction mixture for every mole of the starting benzoquinone, all other conditions remaining equal.

The resulting 2,3,6 - trichloro - 5(4'-chloro-benzoylamino)-1,4-benzoquinone crystallizes from ethanol in yellow crystals; yield about 80% of the theoretical value.

In a similar manner, but using an equimolar amount of 2 - chloro - 5 - chloroacetylamino - 1,4 - benzoquinone as starting material and introducing chlorine only in sufficient amount to retain one mole thereof per mole of said starting material, and operating in aqueous 50%-acetic acid suspension instead of in chloroform, there is obtained 2,6 - dichloro - 5 - chloroacetylamino - 1,4 - benzoquinone.

EXAMPLE 78

2,5-diacetylamino-1,4-benzoquinone 5.6 parts of 2,5-diacetylamino-1,4-diethoxybenzene are dissolved in 50 parts by volume of concentrated sulfuric acid and 4.74 parts of potassium permanganate are added in small portions while cooling with ice. The solution is then stirred for 30 minutes and poured onto ice. The 2,5-diacetylamino-1,4-benzo-quinone which precipitates is filtered off and washed with water. The yield is 70% of the theoretical.

EXAMPLE 79

2,5-diacetylamino-1,4-benzoquinone 14 parts of 2,5-diacetylamino-1,4-diethoxybenzene are heated with 400 parts by volume of glacial acetic acid to 90°. At this temperature, 48 parts of 18.9% lead dioxide are added within 40 minutes, whereupon the mixture is boiled for a short time and then cooled. The precipitated 2,5-diacetylamino-1,4-benzoquinone is filtered off at 20° and washed with water. The yield is 26% of the theoretical.

EXAMPLE 80

2,5-dibenzoylamino-1,4-benzoquinone 17.1 parts of 1,4-diethoxy-2,5-dibenzoylaminobenzene are heated to 100° in 250 parts by volume of glacial acetic acid. At this temperature, 30 parts of dry sodium bichromate are added within 15 minutes. The reaction mixture is then cooled to 10° and the precipitated 2,5-dibenzoylamino-1,4-benzoquinone is filtered off. The yield is 40% of the theoretical.

EXAMPLE 81

2,5-diacetylamino-3,6-dichloro-1,4-benzoquinone 14 parts of finely pulverised 2,5-diacetylamino-1,4-diethoxybenzene are suspended in 250 parts of glacial acetic acid and 20 parts by volume of concentrated hydrochloric acid are added at 40°. 20 parts by volume of hydrogen peroxide are poured into the mixture whereupon the temperature rises. When it has attained 60°, the orange red solution is cooled to room temperature and poured into 1000 parts by volume of water. The 2,5-diacetylamino-3,6-dichloro-1,4-benzoquinone which precipitates after a short time is filtered off and washed with water. It melts at 246°; yield 71% of the theoretical.

EXAMPLE 82

2,5-diacetylamino-3,6-dichloro-1,4-benzoquinone 14 parts of 2,5-diacetylamino-1,4-diethoxybenzene are suspended in 200 parts by volume of glacial acetic acid and 20 parts by volume of concentrated hydrochloric acid are added. The reaction mixture is heated to 40° and anhydrous chlorine gas is introduced for 10 minutes, during which the temperature should not rise over 60°. The solution is cooled to 10° and the quinone is filtered off. The yield of 2,5-diacetylamino-3,6-dichloro-1,4-benzoquinone is 21% of the theoretical.

EXAMPLE 83

2,5-diacetylamino-3,6-dichloro-1,4-benzoquinone 14 parts of 2,5-diacetylamino-1,4-diethoxybenzene are suspended in 200 parts by volume of glacial acetic acid and 20 parts by volume of concentrated hydrochloric acid and 8.61 parts of potassium chlorate are added at 50–60° within 10 minutes. This mixture is stirred for 15 minutes at this temperature and then the quinone is filtered off at 10°. The yield of 2,5-diacetylamino-3,6-dichloro-1,4-benzoquinone is 35% of the theoretical.

According to yet another aspect of the invention, dioxazines which are particularly satisfactory as pigments are obtained when, in accordance with step (d) supra, a 3,6-bis(aroylamido)-1,4-benzoquinone compound of the formula

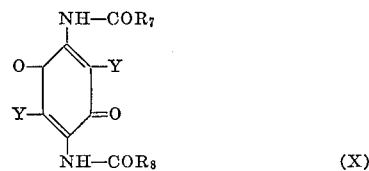

(X)

wherein Y has the aforesaid meanings, $R_7$ and $R_8$ each represent phenyl or a naphthyl radical, is condensed simultaneously or in stages with twice the equimolar quantity of a primary aryl amine or of two different aryl amines as defined above, the aryl radicals of which contain hydrogen or a replaceable substituent in an ortho-position in relation to the $NH_2$ group and may contain other substituents, which are usual in dyestuffs and pigments, and/or may contain condensed heterocyclic rings in the remaining positions, if desired in the presence of inert organic diluents and/or condensation agents to form a dianil of the general formula

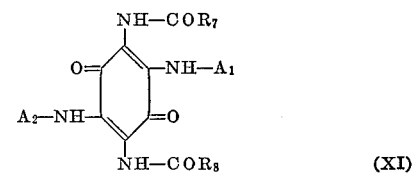

(XI)

wherein $R_7$ and $R_8$ have the above meanings, $A_1$ and $A_2$ represent, independently of each other, aryl radicals of primary aryl amines as defined above, and the dianil of Formula XI is ring-closed by means of moderate heating in diluents and, in some cases, where the primary amine contains no ether group in ortho-position to the $NH_2$-group at the above-mentioned benzene nucleus, in the presence of condensation and/or oxidizing agents, to form a compound of the formula

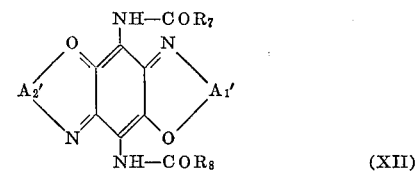

(XII)

wherein $R_7$ and $R_8$ have the above meanings, and $A_1'$ and $A_2'$ represent ortho-arylene radicals corresponding to the above-defined aryl radicals $A_1$ and $A_2$.

The aryl radicals of Formulas X, XI and XII, symbolized by $R_1$ and $R_2$, are phenyl or naphthyl radicals which may be substituted, phenyl radicals being preferred. $R_1$ and $R_2$ may be similar to one another or different from one another, but preferably they are identical. The following are in particular of interest: the phenyl, the 2-, 3- or 4-methylphenyl, the 2-, 3- or 4-chlorophenyl, the 2-, 3- or 4-bromophenyl, the 2-, 3- or 4-methoxyphenyl, the 2-, 3- or 4-ethoxyphenyl, the 2-, 3- or 4-nitrophenyl, the 3,4- or 2,5-dimethylphenyl, the 3,4- 2,5- or 2,4-dichlorophenyl, 2,4,5-trichlorophenyl, the 2- or 4-methylsulfonylphenyl, the 2- or 4-sulfamylphenyl, the 2-, 3-, or 4-acylaminophenyl, the 2-, 3- or 4-sulfonylaminophenyl, the 3- or 4-carboxylic acid ester phenyl, the 3- or 4-carboxylic acid amidophenyl, the 2- or 4-(2'-, 3'- or 4'-nitrophenoxy)-phenyl, the 2- or 4-phenylphenyl-, the 4-(4'-nitrophenyl)-phenyl, the naphthyl-, the nitronaphthyl- and the chloronaphthyl-(1)- or -(2)-radicals.

Particularly pure and solvent-fast and therefore preferred dioxazine pigments of Formula XII are those wherein $R_7$ and $R_8$ represent an unsubstituted phenyl radical, while the purest shades are obtained when $R_7$ and $R_8$ represent the o-methylphenyl or o-chlorophenyl radical.

The aryl radicals, symbolized in Formula XI by $A_1$ and $A_2$, represent phenyl, naphthyl or carbazole radicals, which may be substituted; they are preferably phenyl radicals. They may be identical or different from one another; but preferably both aryl radicals are identical. As mentioned above, $A_1$ and $A_2$ contain as replaceable substituents in the ortho-position in relation to the NH-group an ether group or a thioether group. Suitable ether radicals are in particular alkoxy, cycloalkoxy, aralkoxy and above all those aryloxy groups, which may be readily split-off, namely the phenoxy, the methylphenoxy or the chlorophenoxy group.

Apart from these replaceable substituents in the ortho-position in relation to the NH group, $A_1$ and $A_2$ in Formula XI and, consequently, $A_1'$ and $A_2'$ in Formula XII, may contain substituents which are preferably non-ionic and which are usual in coloring substances, namely, aliphatic, cycloaliphatic, araliphatic or aromatic groups, alkoxy, hydroxyalkoxy, aralkoxy or aryloxy groups, the aryl radicals of the last-mentioned two groups being either non-substituted or substituted, for example, by methyl, chlorine, bromine, methoxy or carboxylic acid ester groups, an alkylmercapto or an arylmercapto group; furthermore halogens such as chlorine or bromine, the nitro, the cyano or the trifluoromethyl group, the primary amino group, carboxylic acid amide and sulfonic acid amide groups, which may be N-substituted, carboxylic acid ester, sulfonic acid aryl ester, acyl, alkylsulfonyl, arylsulfonyl and acylamino groups, "acyl" being understood in the widest sense and representing for example a carbacyl, carbonic acid monoester, carbamyl, thiocarbamyl or a 1,3,5-triazinyl radical, but preferably a carbacyl radical.

$A_1$ and $A_2$ or $A_1'$ and $A_2'$ may further contain, for example, an indol ring or a furan ring condensed with the above-defined benzene nucleus of the primary aromatic amine used as a reactant in step (d).

When, in Formula XI, $A_1$ and $A_2$ are derived from 4-alkoxyanilines, then pure, red dioxazine pigments of Formula XII are obtained; they are derived from 4-phenoxyanilines, then dioxazine pigments according to the invention are obtained, which are also of pure, red shade of even less solubility than the former.

When $R_7$ and $R_8$ represent a phenyl, an o-chlorophenyl or an o-methylphenyl group, then those pigment colors are distinguished by very interesting red shades, wherein $A_1$ and $A_2$ represent phenylene radicals, which are substituted in the p-position in relation to the nitrogen atom of the oxazine ring by a lower alkoxy group, the ethoxy group generally producing a purer shade than the methoxy group, or by a phenoxy group, which may be substituted, and contain in the p-position in relation to the oxygen atom carboxylic acid ester, carboxylic acid amide or acyl groups or halogens, if required. It is therefore a further advantage of the present invention that sparingly soluble, red colors of the dioxazine series, which are fast to migration and overpainting are obtained by means of simple substituents.

Dioxazines with optimal pigment properties are those of the formula

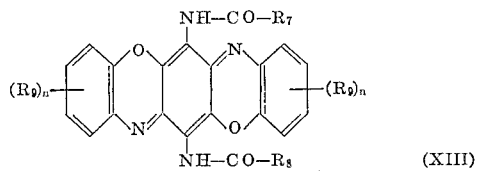

(XIII)

wherein each of $R_7$ and $R_8$ is a member selected from the group consisting of phenyl, chlorophenyl, bromophenyl, and lower alkylphenyl, and $R_9$ is a member selected from the group consisting of lower alkoxy, phenoxy, chlorophenoxy, bromophenoxy, lower alkyl-phenoxy, lower alkoxy-phenoxy, and $n$ is an integer ranging from 1 to 3.

These dioxazines of Formula XIII fill a gap in the catalog of pigments; for there are no pigments of red shade and comparable strength, which possess at the same time satisfactory fastness to migration and to overpainting.

Particularly those compounds of Formula XIII in which $R_7$, $R_8$ is o-chlorophenyl or o-methylphenyl and $R_9$ is in p-position to the nitrogen atom of the oxazine ring and $n$ is 1.

The dianils of Formula XI, used in accordance with the invention, are novel. They are obtained in accordance with step (d) of the above-described process according to the invention, by reacting a 2,5-di-halogen-3,6-bis-[aroylamido] - 1,4 - benzoquinone with primary aryl amines, which contain hydrogen or a mobile substituent in the o-position in relation to the $NH_2$ group, for example in ethylene glycol monoethyl ether or in an aromatic hydrocarbon such as benzene, chlorobenzene, or dichlorobenzene, if required in the presence of an acid-neutralizing medium such as alkali hydroxide, for example sodium hydroxide or alkaline earth oxide or -hydroxide, for example magnesium oxide, alkali carbonate, for example in the presence of an alkali salt of a low fatty acid, for example sodium acetate or of tertiary bases, such as for example tri-isopropanol amine, methyldicyclohexyl amine or tri-isobutyl amine.

The dianils of Formula XI, produced in this manner, may be isolated before their conversion to the dioxazine compounds of Formula XII. However, it is frequently advantageous to convert the substances, which are used for their production, directly into the dioxazine pigments of Formula XII without isolating these dianils.

The condensation of the compounds of Formula XI to the dioxazine pigments of Formula XII is preferably carried out, in conformity with step (d) of the above-described process, under moderate heat in inert organic solvents, in some cases in the presence of acids, acid-yielding or acid-forming compounds, if necessary in the presence of oxidizing agents. The thermal ring-closure in high boiling solvents is preferred, and, when required, oxidizing agents are used but no acid condensation agents, since the use of the latter, in contrast to the known condensations produced with chloranil, generally lead to poorer yields. In the thermal ring-closure, starting materials containing phenoxy groups as repleaceable substituents are preferred, since the latter can be generally more easily split-off than alkoxy groups.

Suitable inert organic solvents are, in particular, aromatic hydrocarbons of the benzene or naphthalene series, which may be halogenated, namely: the xylenes, nitrobenzene, di- and trichlorobenzenes, naphthalene and α-chloronaphthalene, liquid alcohols with up to 12 carbon atoms and the esters thereof, such as, ethanol, propanol, benzyl alcohol, ethylene glycol, the ethylene glycol-methyl, -ethyl and -phenyl ethers, and the acetates, benzoates and phthalates thereof.

Concentrated inorganic oxygen-containing acids, such as sulfuric acid or polyphosphoric acids, and strong organic acids, such as di- or trihaloacetic acids, are suitable as acids.

Examples of acid-yielding or acid-forming compounds are in particular the acid halides of carboxylic or sulfonic acids, such as benzoyl chloride or 4-methylbenzenesulfonic acid chloride, furthermore also thionylchloride, phosphorous pentacholride or metal chlorides, such as aluminum chloride.

Atmospheric oxygen and aromatic nitro compounds, namely nitrobenzene or nitrobenzene sulfonic acids may be mentioned as suitable oxidizing agents. The choice of condensation agents and conditions is based on the starting compounds used in each particular instance.

Dianils of Formula XI, wherein $A_1$ and $A_2$ each contain an ether group in the o-position in relation to the NH-group as replaceable substituents, are heated to 100–300° C., preferably to 150–260° C., in a mixture consisting of an inert organic solvent and an acid-binding agent.

Dianils of Formula XI wherein $A_1$ and $A_2$ each contain an ether group, preferably a phenoxy group which may be sustituted, in the 2- and 4-position in relation to the NH-group, may be converted to the dioxazine compounds of Formula XII at relatively low temperatures and without further additives by being heated in inert organic solvents.

The dianils of Formula XI wherein $A_1$ and $A_2$ each represent an aromatic radical containing a hydrogen atom in the o-position in relation to the NH group, are preferably condensed in an organic solvent in the presence of an oxidizing agent and in some cases in the presence of an acid-yielding agent.

The dioxazine compounds of Formula XII according to the invention generally crystallize out almost completely and in pure form in the hot reaction mixture. They have the characteristic properties of the dioxazine pigments, for example the blue color of the solution in concentrated sulfuric acid, metallic scintillation of the crystals and fluorescence in 1,2-dichlorobenzene. They are isolated by being filtered off and further purified by washing out the precipitate with organic solvents and aqueous acids or bases.

The dioxazines which are sparingly soluble in organic solvents are brought into a finely dispersed form for use as pigments, preferably by means of grinding in the presence of grinding assistants, such as inorganic or organic salts which may be removed by solvents, and if desired in the presence of additional grinding assistants such as organic solvents, acids or bases.

Solid or liquid organic solvents for grinding treatment may be used at room temperature. The pigments which have been isolated from the reaction mixture and dried, are ground for example with dehydrated calcium chloride or with sodium sulphate or sodium chloride in the presence of aliphatic or aromatic hydrocarbons which may be chlorinated and/or nitrated, such as cyclohexane, benzene, toluene, naphthalene, mono-, di- or trichlorobenzene, tetrachloroethane, or nitrobenzene, furthermore in the presence of low aliphatic ketones, such as for example acetone, or low aliphatic monoalcohols, for example methanol, ethanol, methoxy or ethoxyethanol, or nitrogen compounds such as dimethyl or diethylaniline, quinoline or dimethylformamide. In many cases the pigments may also be improved by grinding with organic solvents alone without the addition of salts. After grinding, the assistants are removed; for instance, the inorganic salts are dissolved, for example with water, and the organic assistants are removed by means of distillation or with water vapour.

Finely dispersed, orange, red, Bordeaux, blue and violet pigments having a remarkable color strength as compared to the crude products, are obtained in this manner. They may be used for pigmenting varnishes, rubber, lacquers, for example stoving lacquer, and plastics such as polyvinylchloride. They are also particularly suitable for the production of printing inks for paper printing and for the mass dyeing of viscose and cellulose materials. The orange, red, red-brown, raisin-colored, violet and blue colorations and prints produced therewith are distinguished by a high color strength, and by good fastness to solvents, overpainting, migration, rubbing and light, and good heat stability.

Further details may be seen from the following non-limitative examples, wherein parts represent parts by weight, unless stated otherwise. Temperatures are in degrees centigrade. Parts by weight have a ratio to parts by volume as g:cm.$^3$.

EXAMPLE 84

2,5-dibrom-3,6-bis-benzoylamino-1,4-benzochinone 138.6 parts of 3,6-bis-benzoylamino-1,4-benzoquinone (Example 7, supra) are suspended in 1050 parts by volume of chloroform. 166.2 parts of bromine in 100 parts by volume of chloroform are poured into this suspension within 15 minutes, whereupon the whole is boiled for 12 hours. After the addition of another 15.5 parts of bromine, the whole is boiled for a further 10 hours, then cooled to 20–25° and 200 parts by volume of ethanol are added to the suspension. It is then stirred for 10 minutes at this temperature, cooled to 0 to 5° and the mixture consisting of 2,5 - bis-benzoylamino-3,6-dibromo-hydroquinone and 2,5-bis-benzoylamino-3,6-dibromo-1,4-benzoquinone is filtered off. It is washed with ethanol and dried. The dried mixture is then suspended in 700 parts by volume of glacial acetic acid, heated to 45° and 60 parts of 63% nitric acid dissolved in 100 parts by volume of glacial acetic acid are added. The suspension which slowly turns yellow is stirred for 45 minutes at 40–45°, then cooled to 10° and filtered. The 2,5-dibromo-3,6-bis-benzoylamino-1,4-benzoquinone formed is washed with water and then with ethanol and dried. Yield: 183.3 parts=91.2% of the theoretical. M.P. 248° (under decomposition).

EXAMPLE 85

When, in the preceding Example 84, 157 parts of 2,5-di-(2'-chlorobenzoylamino)-1,4-benzoquinone (Example 1) are used instead of 138.6 parts of 2,5-di-benzoylamino-1,4-benzoquinone, then 2,5-di-(2'-chlorobenzoylamino)-3,6-dibromo-1,4-benzoquinone is obtained with a yield of 94%.

EXAMPLE 86

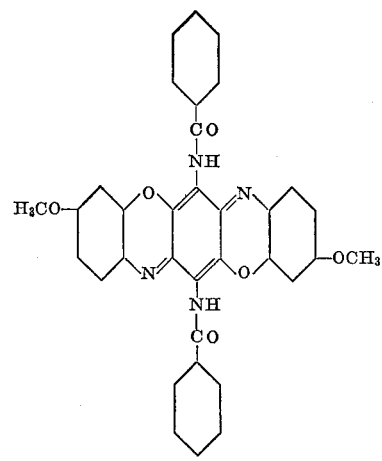

20.16 parts of 2,5-dibromo-3,6-bis-(benzoylamino)-1,4-benzoquinone obtained as described in Example 84, 12.3 parts of 1-amino-2,4-dimethoxybenzene and 13.1 parts of anhydrous sodium acetate are heated for 30 minutes at 200–210° in 250 parts by volume of 1-chloronaphthalene with stirring. The dark red suspension, which is formed, is filtered off at 140°, the residue is washed with ethanol, water, a mixture of ethyleneglycol monoethylether and diluted caustic soda, water and finally with acetone and then dried. 13.7 parts of a red-brown crystalline product of the above indicated formula are obtained. To obtain a fine dispersion it is ground with sodium chloride, sodium sulfate or anhydrous calcium chloride in the presence of a small quantity of the petroleum fraction, which boils at 180–220°. After the salt and solvent have been removed, a red pigment, which has a high color strength and good light, heat, overpainting, and migration fastness properties, is obtained.

When the 2,5-dibromo-3,6-bis(benzoylamino) - 1,4-benzoquinone is replaced by 21.4 parts of 2,5-dibromo-3,6-bis(2'-methylbenzoylamino)-1,4-benzoquinone or by 21.4 parts of 2,5-dibromo-3,6-bis-(4'-methylbenzoylamino)-1,4-benzoquinone or by 22.9 parts of 2,5-dibromo-3,6-bis-(2'-chlorobenzoylamino)-1,4-benzoquinone and the process is otherwise carried out as indicated above, then the following red pigments are obtained:

the 2,6-dimethoxy-9,10-bis-(2'-methylbenzoylamino)-triphenyldioxazine;
the 2,6-dimethoxy-9,10-bis-(4'-methylbenzoylamino)-triphenyldioxazine; or
the 2,6-dimethoxy-9,10-bis-(2'-chlorobenzoylamino)-triphenyldioxazine These pigments have properties which are as good as the 2,6 - dimethoxy - 9,10 - bis - (benzoylamino) - triphenyldioxazine.

The 2,5 - dibromo - 3,6 - bis - (benzoylamino) - 1,4-benzoquinone employed are orange-brown compounds which are sparingly soluble in conventional organic solvents. They are obtained by means of oxidation of the relevant 3,6 - bis - (benzoylamino) - 1,4 - dimethoxy benzenes with nitric acid in glacial acetic acid, by subsequent bromination of 3,5-bis-(benzoylamino)-1,4-benzoquinones formed with bromine in chloroform-2,5-dibromo - 3,6 - bis - (benzoylamino) - 1,4 - hydroquinones forming—and by further treatment with nitric acid in glacial acetic acid.

EXAMPLE 87

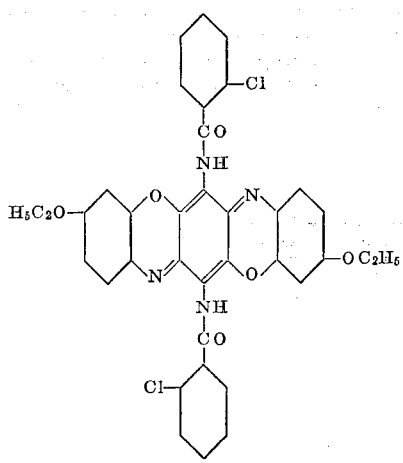

EXAMPLE 95

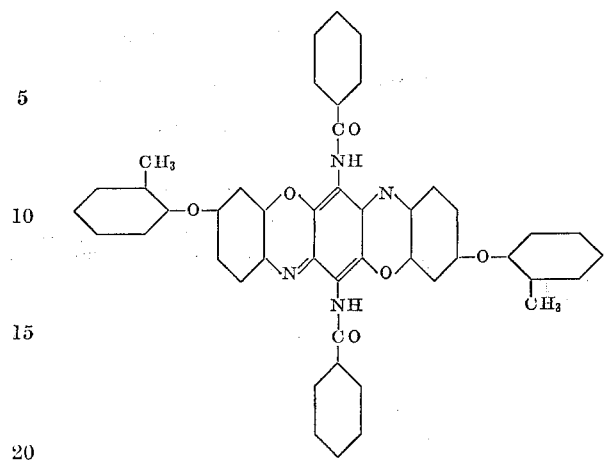

17.2 parts of 2,5 - dibromo - 3,6 - bis - (2' - chlorobenzoylamnio) - 1,4 - benzoquinone (Example 85) are mixed with 10.8 parts of 1-amino-2,4-diethoxybenzene and 9.8 parts of anhydrous sodium acetate, and the mixture is heated for 30 minutes at 200 to 210° in 200 parts by volume of 1 chloronaphthalene with stirring. The dioxazine formed is isolated as in Example 1. 12.6 parts of red-brown crystals having a green scintillation are obtained. After fine dispersion by grinding with inorganic salts, such as calcium chloride, a bluish-red pigment is obtained, which has a high color strength and very good light, heat, overpainting and migration fastness properties, and in particular a very pure shade.

Equally fast dioxazines, having equally good color strength, which have been produced from benzoquinone compounds of the general Formula X and 1-amino-2,4-diethoxy-benzene in accordance with the method described in the above example, are recorded in the following Table V. Column 1 represents the substituents $R_1$ and $R_2$ of the benzoquinone employed, column 2 represents the shade of a polyvinyl chloride film colored with the dioxazine pigment.

TABLE V

| Example No. | $R_1$ and $R_2$ in Formula I | Color in PVC film |
|---|---|---|
| 88 | —⟨ ⟩ | Yellowish red. |
| 89 | —⟨ ⟩—CH₃ | Bluish red. |
| 90 | —⟨ ⟩—CH₃ | Yellowish red. |
| 91 | —⟨CH₃⟩—CH₃ | Bluish red. |
| 92 | —⟨ ⟩—OCH₃ | Yellowish red. |
| 93 | —⟨ ⟩—Cl (Cl) | Bluish red. |
| 94 | —⟨ ⟩—Cl | Yellowish red. |

15.12 parts of 2,5 - dibromo - 3,6 - bis - (benzoylamino) - 1,4 - benzoquinone are mixed with 18.3 parts of 1 - amino - 2,4 - bis - (2' - methylphenoxy) - benzene and 9.2 parts of anhydrous sodium acetate, and the mixture is heated for 30 minutes at 200–210° in 200 parts by volume of 1-chloro-naphthalene with stirring. The red dioxazine compound formed is isolated and purified as indicated in Example 1. 11.5 parts of a pure 2,6-bis-(2'-methylphenoxy) - 9,10 - bis - (benzoylamino) - triphenyldioxazine are obtained in the form of red-brown crystals having green scintillation. By grinding with inorganic salts, a red pigment, which has a high colour strength and excellent fastness to light, heat, overpainting and migration, is obtained. Red dioxazine pigments of similarly good properties are obtained by employing 17.2 parts of 2,5-dibromo - 3,6 - bis - (2' - chlorobenzoylamino) - 1,4 - benzoquinone or 17.2 parts of 2,5 - dibromo - 3,6 - bis - (4' - chlorobenzoylamino) - 1,4 - benzoquinone or 21.4 parts of 2,5-dibromo - 3,6 - bis - (2',4'-dichlorobenzoylamino) - 1,4 - benzoquinone or 17.8 parts of 2,5 - dibromo - 3,6 - bis - (2' - methylbenzoylamino) - 1,4 - benzoquinone or 17.8 parts of 2,5 - dibromo - 3,6 - bis - (4' - methylbenzoylamino) - 1,4 - benzoquinone or 18.7 parts of 2,5 - dibromo - 3,6 - bis - (3',4' - dimethylbenzoylamino) - 1,4 - benzoquinone or 18.8 parts of 2,5 - dibromo - 3,6 - bis - (2' - methoxybenzoylamino)- 1,4 - benzoquinone or 18.8 parts of 2,5 - dibromo - 3,6- bis - (4' - methoxybenzoylamino) - 1,4 - benzoquinone or 17.5 parts of 2,5 - dinitro - 3,6 - bis - (3' - nitrobenzoylamino) - 1,4 - benzoquinone or 17.5 parts of 2,5 - dinitro - 3,6 - bis - (4' - nitrobenzoylamino) - 1,4 - benzoquinone instead of the 2,5 - dibromo - 3,6 - bis - (benzoylamino) - 1,4 - benzoquinone and by otherwise effecting the process as indicated in the above example.

The 2,5 - dinitro - 3,6 - bis - (3' - nitrobenzoylamino)- 1,4 - benzoquinone is produced by oxidation and nitration of the 3,6 - bis - (benzoylamino) - 1,4 - bis - methoxybenzene and the 2,5 - dinitro - 3,6 - bis - (4'-nitrobenzoylamino) - 1,4 - benzoquinone is produced by oxidation and nitration of the 3,6 - bis - (4' - nitrobenzoylamino) - 1,4 - dimethoxybenzene with a mixture of concentrated nitric acid and concentrated sulfuric acid.

EXAMPLE 96

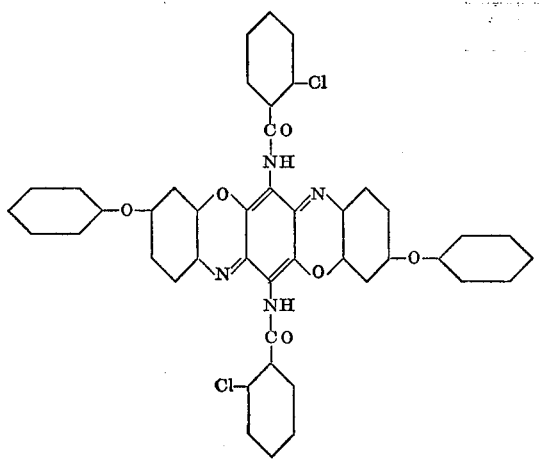

17.2 parts of 2,5 - dibromo - 3,6-bis-(2'-chlorobenzoylamino)-1,4-benzoquinone is mixed with 16.65 parts of 1-amino - 2,4 - bis - (phenoxy)-benzene and 9.2 parts of anhydrous sodium acetate, and the mixture is heated for 1 hour at 200–210° in 250 parts by volume of 1-chloronaphthalene with stirring. The dioxazine compound formed is isolated as in Example 1. 15.8 parts of red-brown crystals are obtained, which yield a pure red pigment of high colour strength and very good light, heat, overpainting and migration fastness properties after grinding with $CaCl_2$.

Equally valuable red pigments of equally good properties are obtained if, in the above example 18.3 parts of 1 - amino - 2,4-bis-(4'-methylphenoxy)-benzene or 18.3 parts of 1 - amino - 2,4-bis-(4'-methylphenoxy)-benzene or 20.8 parts of 1 - amino-2,4-bis-(4'-chlorophenoxy)-benzene or 20.2 parts of 1 - amino-2,4-bis-(4'-methoxyphenoxy)-benzene or 19.7 parts of 1 - amino-2,4-bis-(2'-6'-dimethylphenoxy) - benzene or 22.8 parts of 1-amino-2,4 - bis - (phenoxy)-5-benzoylbenzene or 24.2 parts of 5-amino - 2,4-bis-(4'-chlorophenoxy) - 1- benzoic acid methylester or 27.9 parts of 5 - amino-2,4-bis-(phenoxy)-1-benzoic acid - 2',5' - dichloroanilide or 18.7 parts of 1-amino - 2,4-bis-(phenoxy) - 5 - chlorobenzene or 18.7 parts of 1 - amino-2,4-bis-(phenoxy)-3-chlorobenzene are used instead of the 1-amino - 2,4 - (phenoxy)-benzene and the procedure is otherwise effected as indicated in the example.

EXAMPLE 97

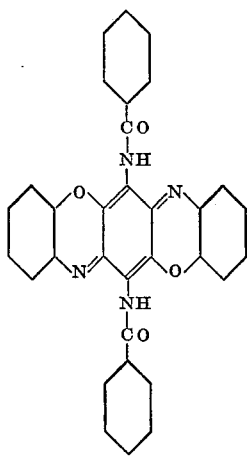

10.08 parts of 2,5 - dibromo - 3,6-bis-(benzoylamino)-1,4-benzoquinone is mixed with 6.15 parts of 2-methoxyaniline and 4.1 parts of anhydrou sodium acetate, and the mixture is heated for 6 hours to 120° in 150 parts by volume of o-dichlorobenzene. The dianil formed is filtered off cold and the residue is washed with o-dichlorobenzene, ethanol, water and acetone and dried. 10.8 parts of a grey-brown, crystalline dianil are obtained.

Formation of the relevant dioxazine compound results by heating the dianil for 1 hour in 200 parts by volume of 1-chloronaphthalene to 230° with thermal ring-closure. An orange-red solution is initially formed, from which the dioxazine compound immediately separates in the form of fine needles. It is drawn off by suction at 150°, washed with ethylglycol monoethyl ether and acetone and dried. 6.5 parts of orange-red crystals are obtained, which supply an orange pigment having very good fastness properties to solvents, overpainting, migration and light, by grinding with inorganic salts.

EXAMPLE 98

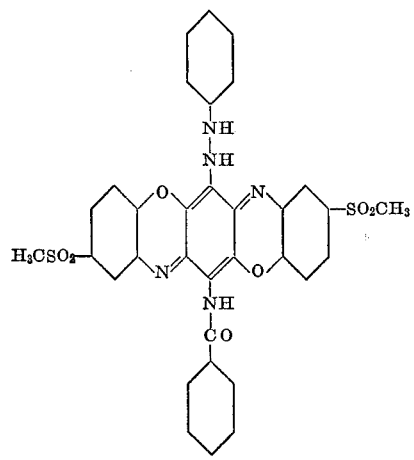

15.12 parts of 2,5 - dibromo-3,6-bis-(benzoylamino)-1,4-benzoquinone is mixed with 15.8 parts of 1-amino-2-phenoxybenzene-5-methylsulfone and 9.2 parts of anhydrous sodium acetate, and the mixture is heated for 20 minutes to 120–130° in 200 parts by volume of 1-chloronaphthalene, the suspension changing to a darker colour. The dianil formed in this way is then heated to 200° without isolation and kept at 200° for 1 hour with stirring.

The dioxazine formed is isolated and purified as indicated in Example 1. 9.3 parts of orange-brown crystals are obtained, which after grinding with $CaCl_2$ produce an orange pigment having good colour strength and excellent migration, overpainting and heat and light fastness properties.

In the following Table VI properties of similar dioxazines have been complied, which have been produced from dianils of the general Formula XI in accordance with the method described in the above Example 94. Column 1 represents the substituents —NH—$A_1$ and —NH—$A_2$ of the dianil employed, column 2 represents the shade of polyvinylchloride film coloured with the finely dispersed dioxazine pigment of Formula XII which is obtained from the dianil of column 1 and in which $A_1'$ and $A_2'$ correspond to =N—A, and —N—$A_2$ minus the phenoxy substituent in o-position to —NH—.

TABLE VI

| Example No. | −NH−A₁ and −NH−A₂ in formula XI | Colors in PVC film |
|---|---|---|
| 99 | −NH−⟨C₆H₃(SO₂C₂H₅)(O−C₆H₅)⟩ | Orange. |
| 100 | −NH−⟨C₆H₃(CH₃)(O−C₆H₅)⟩ | Orange-red. |
| 101 | −NH−⟨C₆H₂(Cl)(CH₃)(O−C₆H₅)⟩ | Do. |
| 102 | −NH−⟨C₆H₃(CONH−C₆H₃Cl₂)(O−C₆H₅)⟩ | Do. |
| 103 | −NH−⟨C₆H₃(CONH−C₆H₄Cl)(O−C₆H₅)⟩ | Bordeaux. |
| 104 | −NH−⟨C₆H₃(CO−C₆H₅)(O−C₆H₅)⟩ | Reddish brown |
| 105 | −NH−⟨C₆H₃(NHCO−C₆H₅)(O−C₆H₅)⟩ | Reddish blue. |
| 106 | −NH−⟨C₆H₂(Cl)(NHCOCH₃)(O−C₆H₅)⟩ | Reddish brown. |
| 107 | −NH−⟨C₆H₃(NHCOCH₃)(O−C₆H₅)⟩ | Violet. |
| 108 | −NH−⟨C₆H₂(Cl)(NHCO−C₆H₅)(O−C₆H₅)⟩ | Reddish violet. |

EXAMPLE 109

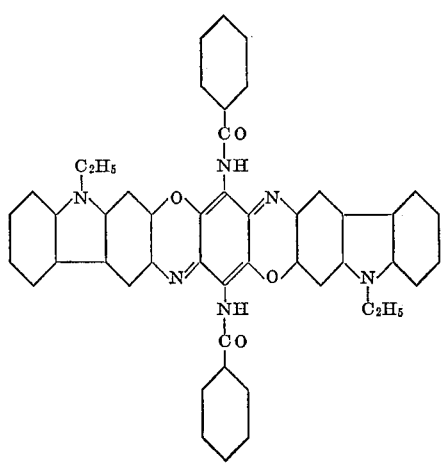

30.24 parts of 2,5-dibromo-3,5 - bis - (benzoylamino)-1,4-benzoquinone, 25.2 parts of 3-amino-N-ethylcarbazole and 9.8 parts of anhydrous sodium acetate are heated for 30 minutes at 200–210° and then for 6 hours at 220° in 500 parts by volume of 1-chloronaphthalene with stirring. The dark suspension is filtered off at 150° and the residue is purified as indicated in Example 1. 12.9 parts of a dioxazine of the above-mentioned formula are obtained, which dioxazine produces a pure violet pigment having excellent light, heat, overpainting and migration fastness properties after grinding with salt.

EXAMPLE 110

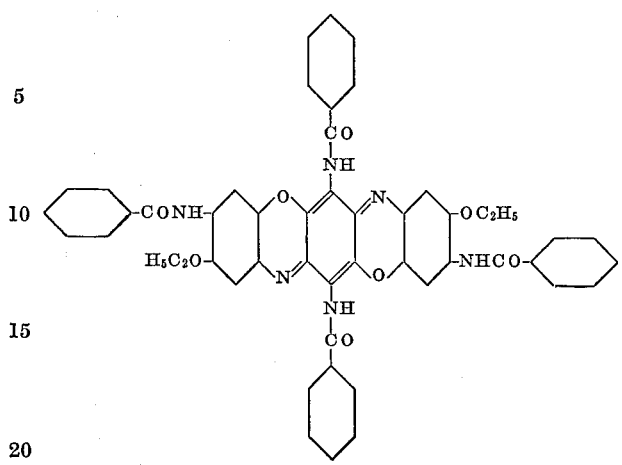

10.8 parts of 2,5-dibromo-3,6 - bis - (benzoylamino)-1,4-benzoquinone, 12 parts of 1-amino-2,5-diethoxy - 4-benzoylaminobenzene and 7.65 parts of tri-isopropanol amine are heated for 4 hours in 150 parts by volume of chlorobenzene under reflux. The precipitate which is formed in this manner is filtered off hot, washed with ethanol and water and dried. 14.4 parts of a grey-violet crystalline dianil are obtained. This product dissolves in a hot mixture of the ethyleneglycol monoethylether and caustic soda with a yellow-brown colour.

TABLE VII

| Example No. | —NH—A₁ and —NH—A₂ in formula XII | Color in PVC film |
|---|---|---|
| 111 | —NH—⟨2,5-(OCH₃)₂-C₆H₂⟩—NHCOCH₃ | Violet. |
| 112 | —NH—⟨2,5-(OCH₃)₂-C₆H₂⟩—NHCO—⟨C₆H₅⟩ | Do. |
| 113 | —NH—⟨2,5-(OCH₃)₂-C₆H₂⟩—NHCO—⟨C₆H₄-Cl⟩ | Blue. |
| 114 | —NH—⟨2,5-(OCH₃)₂-C₆H₂⟩—NHCO—⟨C₆H₄⟩—Cl | Do. |
| 115 | —NH—⟨2,5-(OC₂H₅)₂-C₆H₂⟩—NHCO—CH₃ | Violet. |
| 116 | —NH—⟨2,5-(OC₂H₅)₂-C₆H₂⟩—NHCO—⟨C₆H₄⟩—Cl | Blue. |
| 117 | —NH—⟨2,5-(OC₂H₅)₂-C₆H₂⟩—NHCO—⟨C₆H₄⟩—CH₃ | Violet. |

The dianil is heated for 40 minutes to 175° in 200 parts of o-dichlorobenzene for the purpose of conversion into the dioxazine compound. The suspension formed is filtered off at 150° and the green crystalline residue is washed with ethanol and acetone. 12 parts of a dioxazine compound are obtained, which produce a violet pigment having very good light, overpainting, heat and migration fastness properties after grinding with inorganic salts such as CaCl$_2$ or Na$_2$SO$_4$.

If the ring-closure is carried out in the presence of 10 parts of benzoyl chloride, then only 6 parts of the dioxazine compound are obtained.

The shades of polyvinyl chloride films, coloured with similar dioxazines pigments, are compiled in the following Table III (column 2); these dioxazine pigments were produced from dianils of the general Formula XI in accordance with the method described in the above example. Column 1 represents the substituents —NH—A$_1$ and NH—A$_2$ of the dianil employed.

EXAMPLE 118

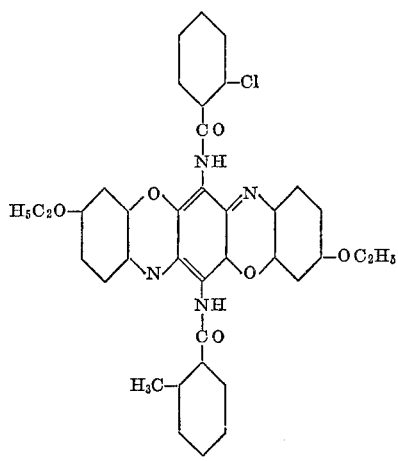

16.6 parts of 2,5-dibromo-3-(2'-chlorobenzoylamino)-6-(2'-methylbenzoylamino)-1,4-benzoquinone, 10.8 parts of 1-amino-2,4-diethoxybenzene and 9.8 parts of anhydrous sodium acetate are heated with stirring for 30 minutes at 200–210° in 200 parts by volume of 1-chloronaphthalene. The dioxazine pigment formed is isolated as in Example 1. 11.1 parts of red-brown crystals having a green scintillation are obtained. After the fine dispersion by means of grinding with salt, a bluish red pigment is obtained, which has similar properties to that described in Example 2.

The 2,5 - dibromo - 3 - (2'- chlorobenzoylamino)-6-(2'-methylbenzoylamino)-1,4-benzoquinone was produced by means of oxidation with nitric acid in glacial acetic acid of the 3-(2'-chlorobenzoylamino)-6-(2'-methylbenzoylamino)-1,4-dimethoxybenzene to form the corresponding 1,4-benzoquinone and by subsequent bromination and oxidation.

EXAMPLE 119

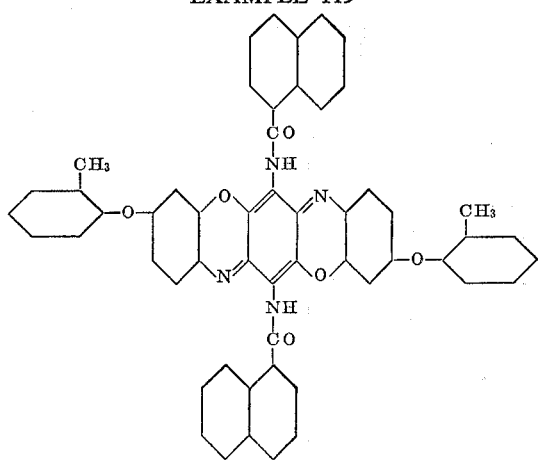

12.08 parts of 2,5-dibromo-3,6-bis(1'-naphthoylamino)-1,4-benzoquinone, 12.2 parts of 1-amino-2,4-bis-(2'-methylphenoxy)-benzene and 6.56 parts of anhydrous sodium acetate are heated for 30 minutes at 200–210° with stirring in 150 parts by volume of 1-chloronaphthalene. The red crystalline dioxazine compound formed is filtered off at 80° and processed as in Example 1. 4.1 parts of a pure 2,6-bis-(2'-methylphenoxy)-9,10-bis-(1'-naphthoylamino)-triphenyldioxazine are obtained. After grinding with calcium chloride a red pigment is obtained, which has a good colour strength, pure shade and good overpainting and migration fastness properties.

A bluish red pigment having excellent fastness to migration is also obtained if 15.8 parts of 5-amino-2,4-bis-(phenoxy)-benzoic acid anilide are used instead of the 1-amino-2,4-bis-(2'-methylphenoxy)-benzene and the procedure is otherwise effected as in the example.

EXAMPLE 120

For the purpose of producing a colour for graphic purposes, 2 parts of the pigment, produced in accordance with Example 8 from 1-amino-2,5-diethoxy-4-benzoylaminobenzene and 2,5-dibromo-3,6-bis-(benzoylamino)-1,4-benzoquinone and ground with salt, are mixed with 36 parts of hydrate of alumina, 60 parts of linseed oil varnish of average viscosity and 0.2 part of cobalt lineolate and ground on the triple roll mill. Violet prints, which have a high colour strength and good fastness to light may be produced, with this paste.

EXAMPLE 121

0.6 part of the pigment, which is ground with salt and produced in accordance with Example 4 from 1-amino-2,4-bis-phenoxy-benzene, is mixed with 67 parts PVC, 33 parts dioctylphthalate, 2 parts of dibutyl tin dilaurate and 2 parts of titanium dioxide and are rolled at 140° for 10–15 minutes. Red PVC films, which have very good migration and light fastness properties, are obtained.

EXAMPLE 122

10 parts of titanium dioxide, 35 parts of a 60% solution of a modified urea alkyd resin in xylene/butanol 1:1, 10 parts of oil of turpentine and 5 parts of xylene are ground in a ball mill for 48 hours with 2 parts of the pigment produced in accordance with Example 2 from 1-amino-2,4-diethoxybenzene and 2,5-dibromo-3,6-bis-(2'-chlorobenzoylamino)-1,4-benzoquinone. If this coloured lacquer is poured on to aluminum foils and burnt-in for 1 hour at 120°, then varnishes are produced which are distinguished by an excellent pure bluish red shade and very good light, heat and overpainting fastness properties.

EXAMPLE 123

2-bromo-5-chloroacetylamino-1,4-benzoquinone 15 parts of 1,4-dimethoxy-2-bromo-5-chloroacetylamino-benzene are stirred into 250 parts by volume of glacial acetic acid at 20° C. 30 parts of dry sodium bichromate are added thereto within 15 minutes. The reaction mixture is then cooled, and 250 parts of cold water are added thereto, thereby precipitating the final product which is then separated by filtration. The yield is about 40% of the theoretical one. The 2-bromo-5-acetylamino-benzoquinone thus obtained is distinguished by fungicidal activity (M.P. 154.8°).

The above-described starting material is produced in a conventional manner by first acetylating the amino group of 1,4-dimethoxy-2-amino-benzene and subsequently brominating the 5-position of the resulting intermediate.

In an analogous manner, there are produced from the corresponding starting materials, the compounds falling under Formulas VII–A/C supra, in which Cl is replaced by bromine and $Y_1$, $Y_2$ and $R_{10}$ have the meaning given in Table VIII below.

TABLE VIII

| Example: | $R_{10}$ | Y | $Y_2$ | M.P., ° C. |
|---|---|---|---|---|
| 124 | —$CH_2CH_3$ | H | H | --- |
| 125 | —$CHCl_2$ | H | H | 165 |
| 126 | —$CCl_3$ | H | H | 215 |
| 127 | —$C_5H_{11}$ | H | H | 146 |
| 128 | —$OC_2H_5$ | H | H | 93 |
| 129 | —$OC_{10}H_{21}$ | H | H | 68–70 |
| 130 | —$CH_2Cl$ | Br | Br | 210–215 |
| 131 | —$CHCl_2$ | Br | Br | 215–217 |
| 132 | —$CCl_3$ | Br | Br | 195–198 |
| 133 | —$C_5H_{11}$ | Br | Br | 162–163 |
| 134 | —$OC_2H_5$ | Br | Br | 136–137 |
| 135 | —$OC_{10}H_{21}$ | Br | Br | --- |

Fungicidal compositions according to the present invention containing as active ingredients compounds of the Formulas VII–A/C but wherein at least one of the radicals Y and $Y_1$ represents chlorine or bromine, have a fair to good fungicidal activity, against at least four to all of the eight fungi species listed hereinbefore.

The compositions according to the invention are suitable for application in the most various fields. Because of their slight toxicity for warm blooded animals and almost complete lack of phytotoxicity in the normal concentrations for application, which vary between 0.1 to 2% calculated on the active ingredient, the compositions are particularly suitable for plant protection. They are used to inhibit and repress the growth of fungi on plants, parts thereof, for the disinfection of the soil, as well as for the protection of organic material of all types from attack and decomposition by fungi. Their use in fruit cultivation is of particular importance. In addition they can be used as dry seed dressings as they have an excellent action, e.g. on *Tilletia tritici, Fusarium culmorum* and many other fungi and do not inhibit germination of the seeds treated.

The compositions according to the invention are produced by thoroughly mixing or milling the active ingredients of the Formulas VII–A/C with suitable carriers in a known manner, with the optional addition of adhesives, dispersing agents or solvents which are inert to the active ingredients. The following forms for application can be produced: dusts, strewing agents, granulates, wettable powders, pastes, emulsion concentrates, solutions (spray and mist), smokes and aerosols. The concentration of active ingredient in these forms for application is between 1 and 98%.

To produce dusts and sprinkling agents, as well as granulates, the active ingredients are thoroughly mixed with solid carriers such as, e.g. talcum, kaolin, bole, loess, chalk, ground limestone, diatomaceous earth, magnesium sulphate, ammonium sulphate, milled synthetic substances and fertilizers, in a concentration of 1–20%, calculated on the active ingredient. In order to attain a good distribution of the active substance on the carriers, it is necessary, particularly for granulates, to impregnate the carriers with melts or solutions of the active ingredient. For this purpose, particularly, easily volatile compounds such as hydrocarbons, their chlorinated derivatives, ketones, esters, etc. are used as solvents. To improve the stability to rain and wind, adhesives such as, solid or liquid sulphite waste liquor, polyvinyl pyrrolidone, hydroxyethyl cellulose, etc. are added to the solid forms for application. To increase the stability to light, protective pigments, for example, are added.

Wettable powders, pastes, emulsion concentrates are obtained by mixing the active ingredients and solid or liquid carriers together with capillary active substances such as wetting agents, dispersing agents, protective colloids and adhesives.

Wetting agents used for these forms of application of the compositions according to the invention are the usual commercial products, e.g. alkali metal salts and alkaline earth metal salts of alkylaryl sulphonic acids such as, dibutylnaphthalene sulphonic acid, and salts of sulphated fatty alcohols, e.g. hexadecanols, octadecenols and octadecanols, as well as condensation products of ethylene oxide and mono- or di-alkyl phenols, the alkyl radicals of which contain 7 to 15 carbon atoms, e.g. dioctyl phenol and nonyl phenol condensates containing at least 8 ethylene oxide groups, polyethylene glycols containing 20–80 ethylene oxide groups; examples of adhesives are: pulverulent and liquid sulphite waste liquor, hydroxyethyl cellulose, polyvinyl pyrrolidone, highly viscous mineral oils, glue and synthetic substances; dispersing or emulsifying agents are: quaternary ammonium compounds having lipophilic radicals, morpholine derivatives, alkali, ammonium, amine, and alkaline earth salts of sulpho-fatty acid esters of medium to higher alkanols, sulphated higher alkyl alkanolamines having at least 8 carbon atoms in the higher alkyl radical, polyethylene glycol ethers of fatty alcohols (e.g. of hexadecanol, octadecenol and octadecanols) or of alkyl phenols (e.g. dioctyl phenol and nonyl phenol), polycondensation products of ethylene oxide with propylene oxide (20–80 alkylene oxide groups), sugar, and water soluble cellulose derivatives.

For the wettable powders, the active ingredients, in the finest distribution, are drawn with the additives mentioned onto solid carriers such as, e.g. talcum, kaolin, bole, loess, chalk, ground limestone, diatomaceous earth, milled synthetic substances. These powders have a particle size of, for example, 20–40μ which is attained by repeated milling, mixing and sieving of the finished concentrates. For emulsion concentrates and pastes, in particular liquid carriers such as water and organic solvents, e.g. alcohols, benzene, xylenes, toluenes, dimethyl sulphoxide, dimethyl fomamide, mineral oil fractions boiling in the range of 120 to 180°, as well as liquid sulphite waste liquor, are used. In choosing the solvents, care should be taken that they have practically no smell, are not phytotoxic, are inert to the active ingredients, and are not easily combustible. The active ingredients are so mixed, milled, sieved and strained with the additives mentioned that, for example, in pastes, the particle size of the solids is not more than 3μ.

In addition, these forms for application contain additives to increase the stability to rain and light as described for the dusts and sprinkling agents. Also, they contain additives which facilitate the adhesion to the substrate and thus facilitate the penetration into the substrate. Examples of such additives are vegetable, animal and mineral oils.

The wettable powders, pastes and emulsion concentrates are diluted with water to the concentrations for practical application which are between 0.01 and 2%, calculated on the active ingredient. In the composition and concentrations for application described, the wettable powders have a good total suspension power which can be improved, e.g. by the addition of synthetic, voluminous silicic acid. The emusifiability of the emulsion concentrates is also very good.

The agents according to the invention are also used in the form of solutions or sprays. For this purpose, the active ingredient(s) of the general Formula I are dissolved in suitable organic solvents, mixtures of solvents or in water. Higher aliphatic and aromatic hydrocarbons, their chlorinated derivatives, alkylnaphthalenes, or mixtures thereof alone or with water are used as organic solvents. The solutions contain the active ingredients in a concentration of 1–20%. They are applied as sprays and mist with suitable apparatus under pressure.

Aerosols are produced from solutions of the active ingredients by the addition of propellant gases which are suitable, in particular, for use indoors and in the garden. Both the solvent as well as the propellant gas can be the carrier for this form of application. Both the solutions as well as the aerosols contain additives to improve the adhesive power, the stability to rain and light and vegetable, animal and mineral oils to improve the adhesion and penetration power.

The forms for application of the agents according to the invention can be mixed very well with other biocidally active compounds or agents which contain such compounds. Thus, other biocidal active ingredients such as insecticides, other fungicides, bactericides, fungistatica, bacteriostatica or nematicides can be admixed to improve the range of action of the agents according to the invention. The agents according to the invention can also contain fertilizers, plant hormones etc.

The following non-limitative examples illustrate the production of compositions according to the invention.

EXAMPLE I 2 parts of 5-n-propoxycarbonyl-amino-2 - chloro - 1,4-benzoquinone are milled with 98 parts of talcum. The dust so obtained can be used, for example, for the disinfection of soil in seed beds as well as for the dusting of plants and parts thereof such as bulbs or tubers.

EXAMPLE II 15 parts of 5-acetylamino-3,6-dibromo-2-chloro-1,4-benzo-quinone are milled with 10 parts of an adhesive, e.g. a condensation product of ethylene oxide and nonylphenol containing 8 to 12 ethylene oxide groups, and 75 parts of talcum. A fungicidally active, non-toxic dust is obtained which can be used as a dry seed dressing. It does not influence germination.

EXAMPLE III 50 parts of 5-ethoxycarbonylamino - 3,6 - dibromo - 2-chloro-1,4-benzoquinone in the finest distribution are mixed and milled in suitable apparatus with 1 part of the sodium salt of dibutylnaphthalene sulfonic acid, 4 parts of pulverised sulphite waste liquor, 1 part of 50% hydroxyethyl cellulose on Champagne chalk and 44 parts of Champagne chalk. A 50% wettable powder (calculated on the active ingredient) is obtained. Suspensions of any concentration desired can be produced therefrom by the addition of water. The wetting power of this powder is good and the total suspension power is 61%.

EXAMPLE IV 50 parts of 5-ethoxycarbonylamino-3,6-dibromo-2-chloro-1,4-benzoquinone in the finest distribution are mixed, milled and again mixed in suitable apparatus with 1 part of the sodium salt of dibutylnaphthalene sulfonic acid, 10 parts of sulfite waste liquor (pulverised), 2 parts of 50% hydroxyethyl cellulose on Champagne chalk, 10 parts of synthetic voluminous silicic acid and 27 parts of Champagne chalk. A 50% wettable powder is obtained which has a better total suspension power (78%) than the wettable powder described in Example III.

EXAMPLE V 50 parts of 5-methoxycarbonylamino-3,6-dibromo-2-chloro-1,4-benzoquinone, 2 parts polyvinyl alcohol as adhesive, 10 parts of sulphite waste liquor (pulverised), 16 parts of Champagne chalk, 20 parts of kaolin and 2 parts of the sodium salt of dibutylnaphthalene sulfonic acid as wetting agent, are milled, mixed and again milled together. A 50% wettable powder is obtained which can be suspended with water to any desired concentration. The suspension obtained can be used in fruit plantations.

EXAMPLE VI

On milling together 10 parts of 5-chloroacetylamino-3,6-dibromo-2-chloro-1,4-benzoquinone and 82 parts of kaolin or chalk and mixing with 8 parts of wetting and dispersing agents, e.g. 8 parts of sulphite waste liquor (pulverised), a concentrate is obtained which, on mixing with water, produces a fungicidal spray which is excellently suitable for the treatment of all parts of plants above the soil.

EXAMPLE VII 20 parts of 5-chloroacetylamino-3,6-dibromo-2-chloro-1,4-benzoquinone are finely milled in a ball mill with 4 parts of a polyvinyl pyrrolidone as dispersing agent and 76 parts of water. The paste obtained is suspended in water and can be used for the combatting of fungi, particularly in fruit cultivation.

EXAMPLE VIII 50 parts of 5-chloroacetylamino-2-chloro-1,4-benzoquinone are mixed with 10 parts of liquid sulphite waste liquor and 40 parts of water and the mixture is milled in a ball mill or passed through a rolling mill several times whereupon a 50% wettable paste is obtained the particle size of which is less than $3\mu$. 0.1% to 0.5% suspensions of such pastes in water can be used to combat fungi, in particular in fruit cultivation.

EXAMPLE IX 10 parts of 5-hexanoylamino-3,6-dibromo-2-chloro-1,4-benzoquinone are dissolved in 15 parts of dimethyl sulfoxide and 65 parts of cyclohexanone. 10 parts of sodium salt of dibutylnaphthalene sulfonic acid are mixed into this solution until homogeneity is attained. An emulsifiable solution is obtained which can be diluted to any concentration desired.

EXAMPLE X 10 parts of 5-($\beta$-chloropropionylamino)-3,6-dibromo-2-chloro-1,4-benzoquinone are dissolved in 80 parts of dimethyl formamide and 10 parts of the sodium salt of dibutylnaphthalene sulfonic acid are mixed into the solution until homogeneity is attained. In this way an emulsifiable solution is obtained which can be diluted to any concentration desired.

Fungicidal activity of the compounds of Formulas VII-A to –C, supra, was especially strong, as confirmed by germination test on spores, against at least three out of eight species of fungi:

Alternaria tenuis,   Fusarium culm.,
Botrytis cinerea,    Mucor spec.,
Clasterosporium c.,  Penicillium spec.,
Coniothyrium dipl.,  Stemphylium cons.

In this test a standard amount of a 1%- a 0.1% and a 0.01%- acetonic solution of the substance to be tested for fungicidal activity was applied under identical conditions to four Petri dishes containing nutrient medium of equal surface area. The solvent was evaporated and an uniform active coating of the active substance, on the nutrient base, ready for inoculation was thus obtained in each of the four dishes. Each dish was then inoculated with an equal amount of spores and the inoculated dishes were kept at room temperature for a standard time of between 2 and 6 days in an atmosphere having a moisture content of above 90% (close to saturation). The germinated spores were then counted. Very good results were obtained, particularly with the following compounds which showed a 95% inhibition of germination in Botrytis cinerea, Clasterosporium c. and Conio-

*thyrium dipl.*, when used in a concentration of only 0.01%:

2-chloro-5-carbethoxyamino-3,6-dibromo-1,4-benzoquinone 2-chloro-5-carbomethoxyamino-3,6-dibromo-1,4-benzoquinone 2-chloro-5-chloroacetamino-3,6-dibromo-1,4-benzoquinone.

The following table shows the results of these tests.

| Compound | Alt. ten. | Botr. cin. | Clast. c. | Conioth. dipl. | Fus. culm. | Muc. spec. | Penic. spec. | Stemph. cons. |
|---|---|---|---|---|---|---|---|---|
| 2-chloro-acetylamino-5-bromo-1,4-benzoquinone | o | o | o | o | o | o | o | o |
| 5-chloroacetylamino-2-chloro-1,4-benzoquinone | + | + | + | + | + | o | o | o |
| 2-acetylamino-5-bromo-1,4-benzoquinone | o | o | o | o | o | o | o | o |
| 2-acetylamino-5-chloro-1,4-benzoquinone | o | o | o | o | o | o | o | o |
| 5-nonanoylamino-2-chloro-1,4-benzoquinone | o | + | + | o | + | o | o | o |
| 2-chloroacetylamino-3,5,6-tribromo-1,4-benzoquinone | o | o | o | o | o | o | o | o |
| 5-chloracetylamino-3,6-dibromo-2-chloro-1,4-benzoquinone | ++ | ++ | ++ | ++ | + | ++ | ++ | + |
| 2-acetylamino-3,5,6-tribromo-1,4-benzoquinone | o | + | + | o | o | o | o | o |
| 5-acetylamino-3,6-dibromo-2-chloro-1,4-benzoquinone | + | ++ | ++ | ++ | ++ | ++ | + | + |
| 5-n-propoxycarbonyl-amino-2-chloro-1,4-benzoquinone | + | + | + | + | + | + | + | + |
| 5-methoxycarbonylamino-3,6-dibromo-2-chloro-1,4-benzoquinone | + | ++ | ++ | ++ | + | + | + | ++ |
| 5-ethoxycarbonylamino-3,6-dibromo-2-chloro-1,4-benzoquinone | + | + | ++ | ++ | + | + | + | + |
| 5-(β-chloropropionyl-amino)-3,6-dibromo-2-chloro-1,4-benzoquinone | + | + | + | + | + | + | + | + |
| 5-hexanoylamino-3,6-dibromo-2-chloro-1,4-benzoquinone | + | + | o | + | o | o | + | + |
| 5-(p-chlorobenzoylamino)-3,6-dibromo-2-chloro-1,4-benzoquinone | + | + | + | + | o | o | o | o |
| 5-phenylacetylamino-3,6-dibromo-2-2-chloro-1,4-benzoquinone | + | + | + | + | + | + | o | o |

The sign "+" in the foregoing table shows an at least 90% inhibition of germination effected by the residue of 1 ccm. of a 0.1% acetone solution of the active ingredient (which concentration corresponds to 1.3γ of active substance per square centimeter); "++" shows an at least 90% inhibition of germination attained by the residue of 1 ccm. of a 0.01% acetone solution of active ingredient. "o" signifies an activity against the respective fungi requiring a concentration of 1% or more of active ingredient in the used test solution and therefore generally insufficient for practical application. The concentration is given in percent calculated on the weight of the acetonic solution of the test compound.

What is claimed is:

1. A method for combatting phytopathogenic fungi, which comprises applying to an area of a substrate infested with fungi of at least one of the species *Botrytis cinerea* and *Clasterosporium c.*, a fungicidally effective amount of a halogenated acylamino-1,4-benzoquinone of the formula

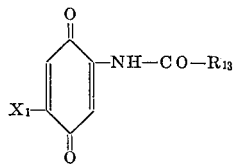

wherein $X_1$ is a member selected from the group consisting of chlorine, bromine and fluorine, and $R_{13}$—CO— is a member selected from the group consisting unsubstituted alkanoic acyl of from 3 to 10 carbon atoms, mono to tri-chloro-, mono- to tri-bromo- and mono to trifluoro substituted alkanoic acyl, of from 2 to 4 carbon atoms, phenyl-carbonyl, chloro-phenyl-carbonyl, lower alkenyl-phenyl-carbonyl, and alkoxycarbonyl of from 2 to 13 carbon atoms.

2. A method for combatting phytopathogenic fungi which comprises applying to an area of a substrate infested with fungi of at least one of the species *Botrytis cinerea* and *Clasterosporium c.*, a fungicidally effective amount of a halogenated acylamino-1,4-benzoquinone of the formula

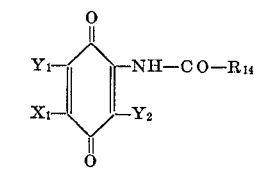

wherein $X_1$ is a member selected from the group consisting of chlorine, bromine, and fluorine, each of $Y_1$ and $Y_2$ is a member selected from the group consisting of bromine and chlorine, and $R_{14}$—CO— is a member selected from the group consisting of unsubstituted alkanoic acyl of from 2 to 19 carbon atoms, mono to tri-chloro-, mono- to tri-bromo- and mono to trifluoro substituted alkanoic acyl, of from 2 to 4 carbon atoms, phenyl-carbonyl, chloro-phenyl-carbonyl, lower alkyl-phenyl-carbonyl, and alkoxycarbonyl of from 2 to 13 carbon atoms.

3. The method of claim 1 wherein the halogenated acylamino benzoquinone has $X_1$ as defined therein and $R_{13}$—CO— is unsubstituted alkanoic acyl of from 3 to 10 carbon atoms.

4. The method of claim 1 wherein the halogenated acylamino benzoquinone has $X_1$ as defined therein and $R_{13}$—CO— is a mono- to tri-chloro-substituted alkanoic acyl of from 2 to 4 carbon atoms.

5. The method of claim 1 wherein the halogenated acylamino benzoquinone has $X_1$ as defined therein and $R_{13}$—CO— is an alkoxycarbonyl of from 2 to 13 carbon atoms.

6. The method of claim 1 wherein the halogenated acylamino benzoquinone has $X_1$ as defined therein and $R_{13}$—CO— is phenyl-carbonyl.

7. The method of claim 1 wherein the halogenated acylamino benzoquinone has $X_1$ as defined therein and $R_{13}$—CO— is a lower alkyl-phenyl-carbonyl.

8. The method of claim 2 wherein the halogenated acylamino benzoquinone has $X_1$, $Y_1$ and $Y_2$ as defined therein and $R_{14}$—CO— is an unsubstituted alkanoic acyl of from 2 to 14 carbon atoms.

9. The method of claim 2 wherein the halogenated acylamino benzoquinone has $X_1$, $Y_1$ and $Y_2$ as defined therein and $R_{14}$—CO— is a mono- to tri-chloro-substituted alkanoic acyl of from 2 to 4 carbon atoms.

10. The method of claim 2 wherein the halogenated acylamino benzoquinone has $X_1$, $Y_1$ and $Y_2$ as defined therein and $R_{14}$—CO— is phenyl-carbonyl.

11. The method of claim 2 wherein the halogenated acylamino benzoquinone has $X_1$, $Y_1$ and $Y_2$ as defined therein and $R_{14}$—CO— is a lower alkyl-phenyl-carbonyl.

12. The method of claim 2 wherein the halogenated acylamino benzoquinone has $X_1$, $Y_1$ and $Y_2$ as defined therein and $R_{14}$—CO— is an alkoxycarbonyl of from 2 to 13 carbon atoms.

13. The method of claim 1 wherein the halogenated acylamino benzoquinone has $X_1$ as defined therein and $R_{13}$—CO— is chlorophenyl-carbonyl.

14. The method of claim 2 wherein the halogenated acylaminobenzoquinone has $X_1$, $Y_1$ and $Y_2$ as defined therein and $R_{14}$—CO— is chloro-phenyl-carbonyl.

References Cited

UNITED STATES PATENTS

| | | | |
|---|---|---|---|
| 2,704,773 | 3/1955 | Young et al. | 260—620 |
| 3,232,932 | 2/1966 | Burdeska et al. | 260—246 |
| 3,370,069 | 2/1968 | Winkelmann et al. | 260—396 |

FOREIGN PATENTS 292,176    5/1916    Germany.

ALBERT T. MEYERS, Primary Examiner

V. D. TURNER, Assistant Examiner

U.S. Cl. X.R.

424—320, 324